US010960408B2

(12) United States Patent
Rinne et al.

(10) Patent No.: US 10,960,408 B2
(45) Date of Patent: Mar. 30, 2021

(54) FLOTATION ARRANGEMENT

(71) Applicant: OUTOTEC (FINLAND) OY, Espoo (FI)

(72) Inventors: Antti Rinne, Espoo (FI); Peter Bourke, West Perth (AU)

(73) Assignee: OUTOTEC (FINLAND) OY, Espoo (FI)

(*) Notice: Subject to any disclaimer, the term of this patent is extended or adjusted under 35 U.S.C. 154(b) by 0 days.

(21) Appl. No.: 16/535,680

(22) Filed: Aug. 8, 2019

(65) Prior Publication Data

US 2019/0388905 A1 Dec. 26, 2019

Related U.S. Application Data

(63) Continuation of application No. PCT/FI2018/050108, filed on Feb. 14, 2018.

(30) Foreign Application Priority Data

Feb. 15, 2017 (WO) .................. PCT/FI2017/050094

(51) Int. Cl.
B03D 1/14 (2006.01)
B03D 1/08 (2006.01)
(Continued)

(52) U.S. Cl.
CPC ........... B03D 1/1406 (2013.01); B03D 1/087 (2013.01); B03D 1/24 (2013.01); C22B 1/00 (2013.01);
(Continued)

(58) Field of Classification Search
CPC ...... B03D 1/082; B03D 1/087; B03D 1/1406; B03D 1/24; B03D 2203/025;
(Continued)

(56) References Cited

U.S. PATENT DOCUMENTS 2,399,845 A * 5/1946 Allen ...................... B03D 1/02
209/167
3,067,957 A * 12/1962 Erck .......................... B03B 9/00
241/23
(Continued)

FOREIGN PATENT DOCUMENTS

AU 2016204951 A1 2/2017
CL 2019000408 U1 5/2019
(Continued)

OTHER PUBLICATIONS

International Search Report issued by the Finnish Patent and Registration Office acting as the International Searching Authority in relation to International Application No. PCT/FI2018/050108 dated Jun. 7, 2018 (6 pages).

(Continued)

*Primary Examiner* — Joseph C Rodriguez
(74) *Attorney, Agent, or Firm* — Robert P. Michal, Esq.; Carter, DeLuca & Farrell LLP

(57) ABSTRACT

A flotation arrangement for treating mineral ore particles suspended in slurry includes a primary flotation line with a rougher part including at least two rougher primary flotation cells and a scavenger part including at least two scavenger primary flotation cells, and a secondary flotation line including at least two secondary flotation cells. A first secondary flotation cell is arranged to receive primary overflow from the at least one rougher primary flotation cell, and a further secondary flotation cell to receive primary overflow from the at least one further rougher primary flotation cell. The further secondary flotation cell is arranged in fluid communication with a previous secondary flotation cell, and underflow from the first secondary flotation cell is arranged to flow into the further secondary flotation cell, or arranged to (Continued)

be combined with secondary underflow of the further secondary flotation cell.

56 Claims, 13 Drawing Sheets

(51) Int. Cl.
*B03D 1/24* (2006.01)
*C22B 1/00* (2006.01)

(52) U.S. Cl.
CPC .... *B03D 2203/02* (2013.01); *B03D 2203/025* (2013.01); *B03D 2203/04* (2013.01)

(58) Field of Classification Search
CPC ............ B03D 2203/04; B03D 2203/06; B03D 2203/08; B03D 2203/02; C22B 1/00
See application file for complete search history.

(56) References Cited

U.S. PATENT DOCUMENTS

| | | | | |
|---|---|---|---|---|
| 4,283,017 | A * | 8/1981 | Coale | B03B 9/00 209/164 |
| 4,460,459 | A * | 7/1984 | Shaw | B03D 1/002 209/167 |
| 4,877,517 | A * | 10/1989 | Bulatovic | B03D 1/016 209/167 |
| 4,960,509 | A | 10/1990 | McNeill | |
| 5,074,994 | A * | 12/1991 | Ray | B03D 1/002 209/167 |
| 5,285,972 | A | 2/1994 | Notebaart et al. | |
| 5,925,862 | A | 7/1999 | Morrisey, IV et al. | |
| 5,951,875 | A | 9/1999 | Kanel et al. | |
| 6,536,596 | B1 | 3/2003 | Niitti et al. | |
| 9,028,782 | B2 * | 5/2015 | Senior | B03D 1/002 209/166 |
| 9,346,062 | B2 * | 5/2016 | Gorain | B03D 1/085 |
| 9,475,067 | B2 * | 10/2016 | Bai | B03D 1/02 |
| 2014/0202932 | A1 * | 7/2014 | Xu | B03D 1/02 209/166 |
| 2019/0176166 | A1 * | 6/2019 | Rinne | G01F 1/661 |
| 2020/0023380 | A1 * | 1/2020 | Bourke | C22B 1/00 |

FOREIGN PATENT DOCUMENTS

| | | |
|---|---|---|
| CL | 2019000409 U1 | 5/2019 |
| CN | 1820853 A | 8/2006 |
| CN | 203678523 U | 7/2014 |
| CN | 209663508 U | 11/2019 |
| CN | 209829277 U | 12/2019 |
| EP | 0476354 A2 | 3/1992 |
| GB | 538996 A | 8/1941 |
| WO | 9924169 A1 | 5/1999 |
| WO | 2015095054 A2 | 6/2015 |
| WO | 2015162340 A1 | 10/2015 |

OTHER PUBLICATIONS

Written Opinion of the International Searching Authority issued by the Finnish Patent and Registration Office acting as the International Searching Authority in relation to International Application No. PCT/FI2018/050108 dated Jun. 7, 2018 (8 pages).
Flotación de Sulfuros de Cobre (https://www.911metallurgist.com/metalurgia/flotacion-de-sulfuros-de-...2) dated Oct. 23, 2016 (10 pages) along with English translation (1 page).
Office Action issued by the Chilean Patent Office in relation to Chilean Application No. 201900408 dated Mar. 16, 2020 (3 pages).
Office Action issued by the Chilean Patent Office in relation to Chilean Application No. 201902266, dated May 15, 2020, 3 pages.
Chinese Office Action dated Nov. 25, 2020, issued in related Chinese Appln. No. 201910114023.8, 7 pages.
Chinese Office Action dated Nov. 25, 2020, issued in corresponding Chinese Appln. No. 201910114279.9, 6 pages.
Extended European Search Report dated Nov. 25, 2020, issued in corresponding European Application No. 18753952.3, 8 pages.
Extended European Search Report dated Nov. 25, 2020, issued in related European Application No. 18753731.1, 7 pages.

* cited by examiner

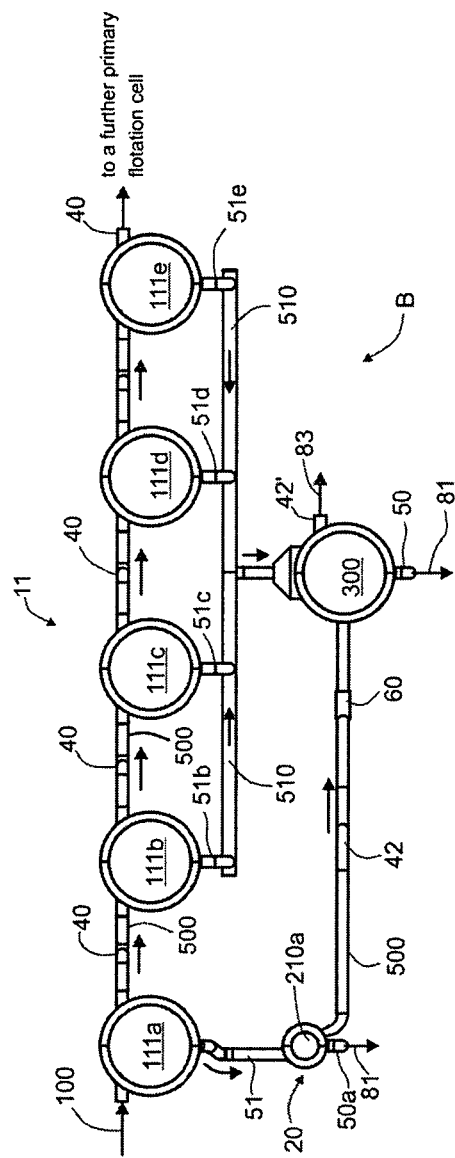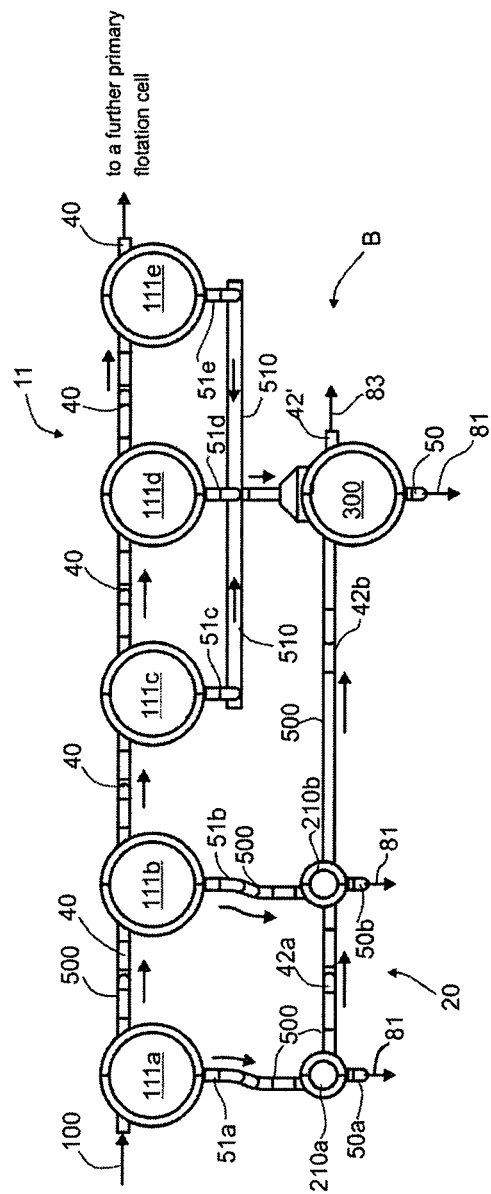

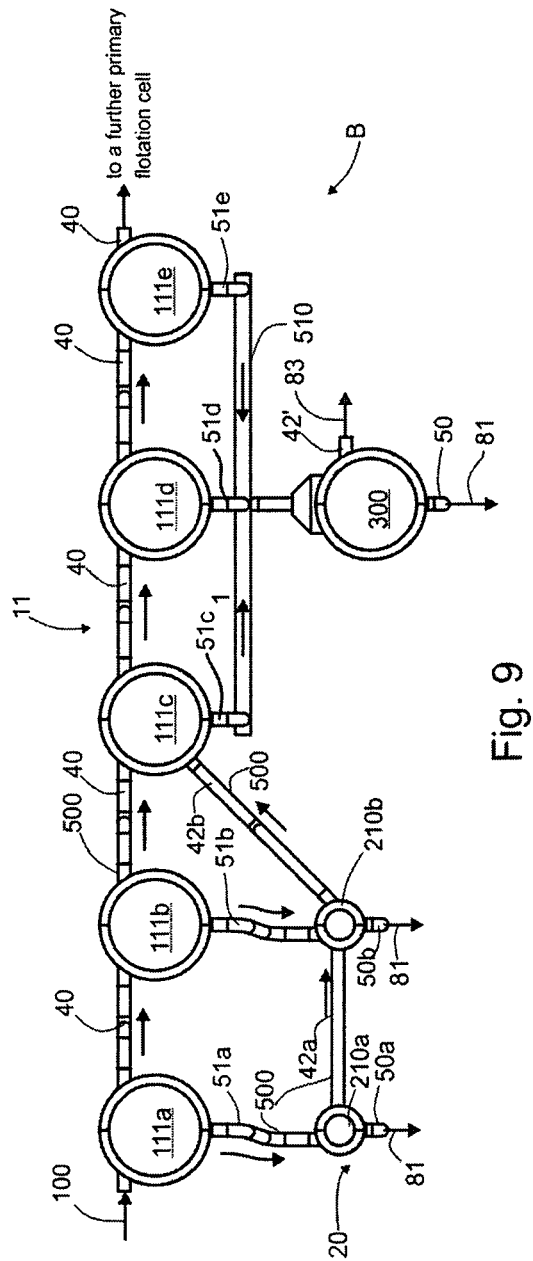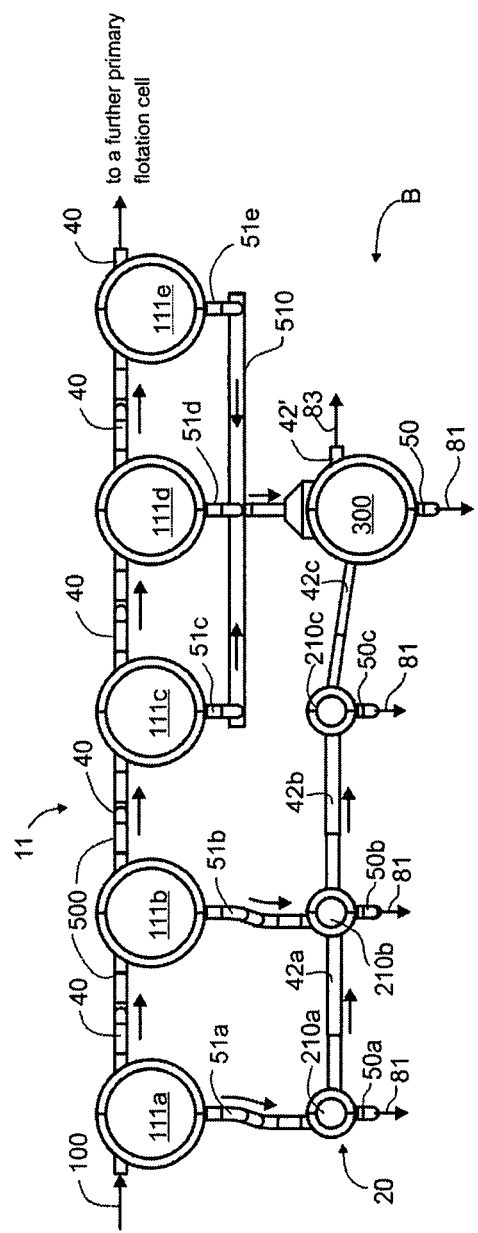

FLOTATION ARRANGEMENT

CROSS-REFERENCE TO RELATED APPLICATIONS

This application is a continuation of PCT International Application No. PCT/FI2018/050108 filed Feb. 14, 2018, which claims priority to International Application No. PCT/FI2017/050094, filed Feb. 15, 2017, the disclosure of each of these applications are expressly incorporated herein by reference in their entirety.

TECHNICAL FIELD

The current disclosure relates to a flotation arrangement and its use, to a flotation plant, and to a flotation method for separating valuable metal containing ore particles from ore particles suspended in slurry.

SUMMARY OF THE INVENTION

A flotation arrangement is provided for treating mineral ore particles suspended in slurry. The flotation arrangement comprises flotation cells for the separation of slurry into underflow and overflow. The separation is performed with the help of flotation gas. The flotation arrangement comprises a primary flotation line comprising a rougher part with at least two rougher primary flotation cells connected in series and arranged in fluid communication, overflow from a first rougher primary flotation cell arranged to flow directly into a secondary flotation line; the primary flotation line further comprising a scavenger part with at least two scavenger primary flotation cells connected in series and arranged in fluid communication, overflow from the scavenger primary flotation cells arranged to flow back into the a rougher flotation cell of the primary flotation line, or into a regrinding step and then into a scavenger cleaner flotation line. In the primary flotation line, a subsequent primary flotation cell is arranged to receive primary underflow from a previous primary flotation cell. The secondary flotation line comprises at least two secondary flotation cells, wherein in the secondary flotation line, a first secondary flotation cell is arranged in fluid communication with at least one rougher primary flotation cell, and arranged to receive primary overflow from the at least one rougher primary flotation cell for the recovery of a first concentrate. The flotation arrangement is characterized in that in the secondary flotation line, a further secondary flotation cell is arranged in fluid communication with at least one further rougher primary flotation cell, and arranged to receive primary overflow from the at least one further rougher primary flotation cell for the recovery of a first concentrate; the further secondary flotation cell is arranged in fluid communication with a previous secondary flotation cell, and underflow from the first secondary flotation cell is arranged to flow into the further secondary flotation cell, or arranged to be combined with secondary underflow of the further secondary flotation cell.

The use of a flotation arrangement according to the present disclosure is intended to be employed in recovering mineral ore particles comprising a valuable mineral.

The flotation plant according to the invention comprises a flotation arrangement according to the present disclosure.

The flotation method for treating mineral ore particles suspended in slurry in flotation stages in which slurry is separated into underflow and overflow with the help of flotation gas comprises subjecting slurry to primary flotation comprising at least two rougher flotation stages in series and in fluid communication, primary overflow from a first rougher stage directed to secondary flotation; the primary flotation further comprising at least two scavenger flotation stages in series and in fluid communication, primary overflow from the scavenger stages directed back to the first rougher stages, or into regrinding and then cleaner flotation, and in the primary flotation, primary underflow from a previous flotation stage is directed to a subsequent flotation stage. In the flotation method slurry is further subjected to secondary flotation comprising at least two secondary flotation stages in fluid communication, wherein primary overflow from at least a first rougher flotation stage is directed to a first secondary flotation stage for the recovery of a first concentrate, the at least first rougher flotation stage and the first secondary flotation stage being in series and in fluid communication. The flotation method is characterized in that in secondary flotation primary overflow from at least one further rougher flotation stage is directed to a further secondary flotation stage in series and in fluid communication with the at least one further rougher flotation stage, for the recovery of a first concentrate, the at least one further rougher flotation stage and the further secondary flotation stage being in series and in fluid communication; the further secondary flotation stage and a previous secondary flotation stage are in fluid communication; and underflow from the first secondary flotation stage is directed to the further secondary flotation stage, or combined with secondary underflow of the further secondary flotation stage.

With the invention described herein, the focus of treatment of slurry may be shifted on an efficient separation of valueless fraction from the ore particles and recovering a maximal amount of valuable particles. In other words, ore particles comprising very small or even minimal amounts of valuable material may be recovered for further processing/treatment. This may be especially beneficial for ores of poor quality, i.e. ores with very little valuable material initially, for example from poor mineral deposits which may have previously been considered economically too insignificant to justify utilization.

Basically, ore particles comprising relatively high amount of valuable mineral are treated only once in a primary flotation line, which may be understood as a treatment line comprising rougher and/or scavenger cells. Underflow from the primary flotation cells is directed downstream along the primary flotation line to ensure that as much of the valuable mineral material is recovered in the primary line. At the same time, overflow from the primary flotation cells is directed into a secondary flotation line, which may be understood as a treatment line comprising cleaner cells, for the efficient separation of any non-desired particles from the material recovered from the primary line flotation cells. By directing the secondary underflow from a first secondary flotation cell downstream along the secondary flotation line, it may be further ensured that as much of the valuable mineral material is recovered.

Further, when the underflow from a primary flotation cell or cells, or from a secondary flotation cell or cells, is forwarded downstream along the primary or secondary line in the direction of the flow of slurry, or the primary overflow into the secondary line, by gravity, energy consumption can be curbed while still achieving very efficient recovery of valuable mineral.

It is possible to achieve a high grade for a part of the slurry stream, and at the same time, high recovery for the entire slurry stream passing through the flotation arrangement. Retreatment of the slurry flow in a number of adjoining flotation cells in this manner ensures effective recovery of mineral without any significant increase in energy consumption, as the flows of slurry need not be pumped in energy-consuming ways, but by utilizing the inherent hydraulic head of the downstream flows of slurry within the flotation arrangement and plant.

In the beginning or forward end of the flotation arrangement, it is thus possible to recover high grade of ore particle comprising valuable mineral, whereas in the end of the flotation arrangement may be utilized for recovering as much as possible of the ore particles comprising even a small amount of the valuable mineral. The grade of the overflow is increased by the utilization of the secondary flotation line, while especially the primary line ensures efficient overall recovery of ore particles comprising valuable mineral. The flotation arrangement enables increasing the grade without high-energy pumping, thus providing significant advantages over the state of the art.

The flotation arrangement, its use, the flotation plant, and the flotation method according to the invention has the technical effect of allowing the flexible recovery of various particle sizes, as well as efficient recovery of valuable mineral containing ore particles from poor ore raw material with relatively low amounts of valuable mineral initially. The advantages provided by the structure of the flotation line allow the accurate adjustment of the flotation line structural parameters according to the target valuable material at each installation.

By treating the slurry according to the present invention as defined by this disclosure, recovery of valuable material containing particles may be increased. The initial grade of recovered material may be lower, but the material (i.e. slurry) is also thus readily prepared for further processing, which may include for example regrinding and/or cleaning.

Arranging flotation lines so that at least some, or all flotation cells (i.e. the bottoms of the flotation cells) are on same level increases construction speed, simplifies planning and construction and thus reduces costs. This so-called uniplanarity of flotation cells or flotation lines might offer advantages through reduction of investment costs, as setting up a plant requires less ground work and less space. This might be especially advantageous when the flotation cell size is increased. This again, might be desirable from the perspective of optimizing process performance while reducing capital costs for the investment. In case the flotation cells are arranged in a uniplanar fashion, the flow of slurry from on flotation cell to the following flotation cell may be achieved by pumping action, for example by low-head pumps.

According to some embodiments of the invention, the flotation lines may also be arranged in a stepwise fashion, so that at least some of the flotation cells (i.e. the bottoms of the flotation cells), either in the primary flotation line or in the secondary flotation line are positioned at different levels: for example, the bottom of a first primary flotation cell of a primary flotation line may be arranged higher than the bottom of the following further primary flotation cell(s) (rougher or scavenger primary flotation cell), and/or higher than the bottom of the first secondary flotation cell into which the overflow from the first primary flotation cell is directed. In that way, the slurry surface level of at least some of the flotation cells following the first primary flotation cells is lower, thus creating a step between any two subsequent flotation cells in direct fluid connection with each other. The thus-created step allows achieving a hydrostatic head or hydrostatic pressure differential (hydraulic gradient) between the two subsequent flotation cells, whereby the flow of slurry from one cell to the next may be realized by gravitational force, without any separate pumps. The hydraulic gradient forces the flow of slurry towards the tailings outlet or outlets of the flotation line. This may reduce the need for additional pumping. Further, pumping power requirement might be reduced as material flow is directed downstream gravitationally due to drop in slurry surface levels. This can apply even to embodiments in which the slurry surface levels of adjacent flotation cells in the flotation line are at one level. The decreased need of energy-intensive pumping will lead to savings in energy consumption, as well as simplified construction of the flotation operation, and to less need of space for the construction.

By directing the at least one first primary overflow directly to at least one stage of first secondary flotation for the recovery of a first concentrate is meant that the process comprises no grinding step in between the primary flotation stage and the secondary flotation stage. By eliminating the grinding step, the hydraulic head of slurry flow is not lost between any two subsequent stages, and gravity only may be used to drive the flow of slurry. The first primary overflow may thus be separated from the lower quality further primary overflow. The first primary overflow may be subjected to flotation separately from the further primary overflow, which increases the recovery of ore particles comprising valuable mineral.

Basically, flotation aims at recovering a concentrate of ore particles comprising a valuable mineral. By concentrate herein is meant the part of slurry recovered in overflow or underflow led out of a flotation cell. By valuable mineral is meant any mineral, metal or other material of commercial value.

Flotation involves phenomena related to the relative buoyancy of objects. The term flotation includes all flotation techniques. Flotation can be for example froth flotation, dissolved air flotation (DAF) or induced gas flotation. Froth flotation is a process for separating hydrophobic materials from hydrophilic materials by adding gas, for example air or nitrogen or any other suitable medium, to the process. Froth flotation could be made based on natural hydrophilic/hydrophobic difference or based on hydrophilic/hydrophobic differences made by addition of a surfactant or collector chemical. Gas can be added to the feedstock subject of flotation (slurry or pulp) by a number of different ways.

By a flotation arrangement herein is meant an assembly comprising a number, at least two, flotation units or flotation cells that are arranged in fluid connection with each other for allowing either gravity-driven or pumped slurry flow between flotation cells, to form a flotation line. The arrangement is meant for treating mineral ore particles suspended in slurry by flotation. Thus, valuable metal-containing ore particles are recovered from ore particles suspended in slurry. Slurry is fed through a feed inlet to the first flotation cell of the flotation line for initiating the flotation process. Flotation arrangement may be a part of a larger flotation plant containing one or more flotation arrangements. Therefore, a number of different pre-treatment and post-treatment devices or stages may be in operational connection with the components of the flotation arrangement, as is known to the person skilled in the art.

By flotation line herein is meant a part of the flotation arrangement where a number of flotation cells are arranged in fluid connection with each other so that the underflow of each preceding flotation cell is directed to the following or subsequent flotation cell as a infeed until the last flotation cell of the flotation line, from which the underflow is directed out of the line as tailings or reject flow. In connection with the method for flotation according to the present invention, by flotation herein is meant the entire flotation process taking place in a flotation line.

The flotation cells in a flotation arrangement are fluidly connected to each other. The fluid connection may be achieved by different lengths of conduits such as pipes or tubes, the length of the conduit depending on the overall physical construction of the flotation arrangement.

Alternatively, the flotation cells may be arranged in direct cell connection with each other. By direct cell connection herein is meant an arrangement, whereby the outer walls of any two subsequent flotation cells are connected to each other to allow an outlet of a first flotation cell to be connected to the inlet of the subsequent flotation cell without any separate conduit. A direct contact reduces the need for piping between two adjacent flotation cells. Thus, it reduces the need for components during construction of the flotation line, speeding up the process. Further, it might reduce sanding and simplify maintenance of the flotation line.

The fluid connection between flotation cells and flotation units may be direct, i.e. the two flotation cells (belonging to the same or different flotation lines) may be immediately adjacent to each other. Alternatively, the two flotation cells may be positioned at a distance from each other and connected through a pipe, channel or other means known in the art. The fluid connection between flotation cells may comprise various regulation mechanisms.

By "neighboring", "adjacent", or "adjoining" flotation cell herein is meant the flotation cell immediately following or preceding any one flotation cell, either downstream or upstream, or either in a primary line, in a secondary line, or the relationship between a flotation cell of a primary line and a flotation cell of a secondary line into which the overflow from the flotation cell of the primary line is directed.

By a flotation cell is herein meant a tank or vessel in which a step of a flotation process is performed. A flotation cell is typically cylindrical in shape, the shape defined by an outer wall or outer walls. The flotation cells regularly have a circular cross-section. The flotation cells may have a polygonal, such as rectangular, square, triangular, hexagonal or pentagonal, or otherwise radially symmetrical cross-section, as well. The number of flotation cells may vary according to a specific flotation arrangement and/or operation for treating a specific type and/or grade of ore, as is known to a person skilled in the art. In connection with the method for flotation according to the present invention, by flotation stage herein is meant the flotation process taking place in one flotation cell.

The flotation cell may be a froth flotation cell, such as a mechanically agitated cell or tank cell, a column flotation cell, a Jameson cell, or a dual flotation cell. In a dual flotation cell, the cell comprises at least two separate vessels, a first mechanically agitated pressure vessel with a mixer and a flotation gas input, and a second vessel with a tailings output and an overflow froth discharge, arranged to receive the agitated slurry from the first vessel. The flotation cell may also be a fluidized bed flotation cell (such as a Hydro-Float™ cell), wherein air or other flotation gas bubbles which are dispersed by the fluidization system percolate through the hindered-setting zone and attach to the hydrophobic component altering its density and rendering it sufficiently buoyant to float and be recovered. In a fluidized bed flotation cell axial mixing is not needed. The flotation cell may also be of a type where a mechanical flotation cell (i.e. a flotation cell comprising a mechanical agitator or mixer) comprises a microbubble generator for generating microbubbles into the slurry within the flotation cell. The size distribution of microbubbles is smaller than that of the conventional flotation gas bubbles introduced by the mixer or by other gas introduction system which typically fall into a size range of 0.8-2 mm. The size range of microbubbles may be 1 µm-1.2 mm. Microbubbles may be introduced by a microbubble generator comprising a slurry recirculation system, or a direct sparger system.

The flotation cell may also be an overflow flotation cell operated with constant slurry overflow. In an overflow flotation cell, the slurry is treated by introducing flotation gas bubbles into the slurry and by creating a continuous upwards flow of slurry in the vertical direction of the first flotation cell. At least part of the valuable metal containing ore particles are adhered to the gas bubbles and rise upwards by buoyancy, at least part of the valuable metal containing ore particles are adhered to the gas bubbles and rise upwards with the continuous upwards flow of slurry, and at least part of the valuable metal containing ore particles rise upwards with the continuous upwards flow of slurry. The valuable metal containing ore particles are recovered by conducting the continuous upwards flow of slurry out of the at least one overflow flotation cell as slurry overflow. As the overflow cell is operated with virtually no froth depth or froth layer, effectively no froth zone is formed on the surface of the pulp at the top part of the flotation cell. The froth may be non-continuous over the cell. The outcome of this is that more valuable mineral containing ore particles may be entrained into the concentrate stream, and the overall recovery of valuable material may be increased.

All of the flotation cells of a flotation arrangement according to the invention may be of a single type, that is, rougher flotation cells in the rougher part, scavenger flotation cells in the scavenger part, and secondary flotation cells of the secondary flotation line may be of one single flotation cell type so that the flotation arrangement comprises only one type of flotation cells as listed above. Alternatively, a number of flotation cells may be of one type while other cells are of one or more type so that the flotation arrangement comprises two or more types of flotation cells as listed above.

Depending on its type, the flotation cell may comprise a mixer for agitating the slurry to keep it in suspension. By a mixer is herein meant any suitable means for agitating slurry within the flotation cell. The mixer may be a mechanical agitator. The mechanical agitator may comprise a rotor-stator with a motor and a drive shaft, the rotor-stator construction arranged at the bottom part of the flotation cell. The cell may have auxiliary agitators arranged higher up in the vertical direction of the cell, to ensure a sufficiently strong and continuous upwards flow of the slurry.

By overflow herein is meant the part of the slurry collected into the launder of the flotation cell and thus leaving the flotation cell. Overflow may comprise froth, froth and slurry, or in certain cases, only or for the largest part slurry. In some embodiments, overflow may be an accept flow containing the valuable material particles collected from the slurry. In other embodiments, the overflow may be a reject flow. This is the case in when the flotation arrangement, plant and/or method is utilized in reverse flotation.

By underflow herein is meant the fraction or part of the slurry which is not floated into the surface of the slurry in the flotation process. In some embodiments the underflow may be a reject flow leaving a flotation cell via an outlet which typically is arranged in the lower part of the flotation cell. Eventually the underflow from the final flotation cell of a flotation line or a flotation arrangement may leave the entire arrangement as a tailings flow or final residue of a flotation plant. In some embodiments, the underflow may be an accept flow containing the valuable mineral particles. This is the case in when the flotation arrangement, plant and/or method is utilized in reverse flotation.

By reverse flotation herein is meant an inverse flotation process typically utilized in the recovery of iron. In that case, the flotation process is directed for collecting the non-valuable part of the slurry flow into the overflow. The overflow in reverse flotation process for iron contains typically silicates, while the valuable iron-containing mineral particles are collected in the underflow. Reverse flotation may also be used for industrial minerals, i.e. geological mineral mined for their commercial values which are not fuel, nor sources of metals, such as bentonite, silica, gypsum, and talc.

By downstream herein is meant the direction concurrent with the flow of slurry (forward current, denoted in the figures with arrows), and by upstream herein is meant the direction countercurrent with or against the flow of slurry.

By concentration herein is meant the floated part or fraction of slurry of ore particles comprising a valuable mineral. A first concentration may comprise ore particles comprising one valuable mineral, where as a second concentration may comprise ore particles comprising another valuable mineral. Alternatively, the distinctive definitions first, second, may refer to two concentrations of ore particles comprising the same valuable mineral but two distinctly different particle size distributions.

By a rougher flotation, rougher part of the flotation line, rougher stage and/or rougher cells herein is meant a flotation stage that produces a rougher concentrate. The objective is to remove a maximum amount of the valuable mineral at as coarse a particle size as practical. Complete liberation is not required for rougher flotation, only sufficient liberation to release enough gangue from the valuable mineral to get a high recovery. The primary objective of a rougher stage is to recover as much of the valuable minerals as possible, with less emphasis on the quality of the concentrate produced.

The rougher concentrate is normally subjected to further stages of cleaner flotation in a rougher cleaner flotation line to reject more of the undesirable minerals that have also reported to the froth, in a process known as cleaning. The product of cleaning is known as cleaner concentrate or final concentrate.

Rougher flotation is often followed by scavenger flotation that is applied to the rougher tailings. By a scavenger flotation, a scavenger part of the flotation line, scavenger stage and/or a scavenger cell is meant a flotation stage wherein the objective is to recover any of the valuable mineral material that was not recovered during the initial rougher stage. This might be achieved by changing the flotation conditions to make them more rigorous than the initial roughing, or, in some embodiments of the invention, by the introduction of microbubble into the slurry. The concentrate from a scavenger cell or stage could be returned to the rougher feed for re-floating or directed to a regrinding step and thereafter to a scavenger cleaner flotation line.

By cleaner flotation, a rougher/scavenger cleaner line, cleaner/cleaning stage and/or a cleaner cell is meant a flotation stage wherein the objective of cleaning is to produce as high a concentrate grade as possible.

By pre-treatment and/or post-treatment and/or further processing is meant for example comminution, grinding, separation, screening, classification, fractioning, conditioning or cleaning, all of which are conventional processes as known to a person skilled in the art. A further processing may include also at least one of the following: a further secondary flotation cell, which may be a conventional cleaner flotation cell, a recovery cell, a rougher cell, or a scavenger cell.

By slurry surface level herein is meant the height of the slurry surface within the flotation cell as measured from the bottom of the flotation cell to the launder lip of the flotation cell. In effect, the height of the slurry is equal to the height of a launder lip of a flotation cell as measured from the bottom of the flotation cell to the launder lip of the flotation cell. For example, any two subsequent flotation cells may be arranged in a stepwise fashion in a flotation line so that the slurry surface level of such flotation cells is different (i.e. the slurry surface level of the first of such flotation cells is higher than the slurry surface level of the second of such flotation cells). This difference in the slurry surface levels is defined herein as "step" between any two subsequent flotation cells. The step or the difference in slurry surface levels is a difference allowing the flow of slurry be driven by gravity or gravitation force, by creating a hydraulic head between the two subsequent flotation cells.

In an embodiment of the flotation arrangement, the at least one of the secondary flotation cells of the secondary flotation line is arranged in direct fluid communication with the first rougher primary flotation cell from which it is arranged to receive primary overflow.

By direct fluid communication herein is meant that any two neighboring or adjacent or adjoining flotation cells are so connected that there are no additional process steps such as grinding arranged in between any two flotation cells or flotation stages. This is not to be mixed up with the definition of direct cell connection as described above.

In certain cases of conventional froth flotation process, the overflow of a first flotation cell may be directed initially to a re-grinding step, or to other further processing step before it is directed into a secondary flotation cell. This is especially typical for conventional flotation operation comprising a rougher or a scavenger stage followed by a cleaner stage.

In the flotation arrangement, plant and method according to the present invention, such further processing step may be forgone, and the rougher primary flotation cell from which primary overflow is directed into a secondary flotation cell and that secondary flotation cell may thus be in direct fluid connection with each other. There may be a similar direct fluid communication arranged between any other two flotation cells of the flotation arrangement, as well.

In an embodiment of the flotation arrangement, the primary flotation line comprises at least four primary flotation cells, or 3-10 flotation cells, or 4-7 flotation cells.

In an embodiment of the flotation arrangement, the rougher part of the primary flotation line comprises at least two rougher primary flotation cells, or 2-6 rougher primary flotation cells, or 2-4 primary flotation cells.

In an embodiment of the flotation arrangement, the scavenger part of the primary flotation line comprises at least two scavenger primary flotation cells, or 2-6 scavenger primary flotation cells, or 2-4 scavenger primary flotation cells.

Having a sufficient number of primary flotation cells (rougher and/or scavenger primary flotation cells) allows the production of high grade for part of the concentrate, and at the same time, ensuring high recovery of the desired valuable mineral throughout the primary line, thus avoiding having any of the valuable mineral ending up in the tailings flow. As much as possible of the ore particles comprising valuable mineral may be floated while still minimizing the required pumping energy to achieve this.

In an embodiment of the flotation arrangement, the secondary line comprises at least two secondary flotation cells, or 2-10 secondary flotation cells, or 4-7 secondary flotation cells.

Even a small number of secondary flotation cells may be sufficient for cleaning the overflow from primary flotation cells to a reasonable level, i.e. increasing the grade of the concentrate recovered from the primary line. The underflow even from a low number of secondary flotation cells has a high enough volume to be sent to further treatment in the primary line to further increase the recovery.

In an embodiment of the flotation arrangement, the number of secondary flotation cells in series in the secondary flotation line is the same or lower than the number of primary flotation cells in series in the primary flotation line.

The overflow from a primary cell or cells going to the first flotation cell or cells of the secondary flotation line may have higher quality (i.e. higher grade) than the overflow from the primary flotation cells located further downstream in the primary flotation line going to the further secondary flotation cell or cells of the secondary flotation line. The further secondary flotation cell or cells of the secondary flotation line may thus need more capacity for treating the slurry efficiently. Further, having excessive treatment in the first secondary flotation cell or cells may lead to increased pumping requirements, which would lead to undesired increased energy consumption. The effect of this kind of embodiment is that while engaging in minimum pumping to drive the flows of slurry, at least a part of the concentrate may be recovered with very high grade.

In an embodiment of the flotation arrangement, a secondary flotation cell is arranged to receive primary overflow from 1-3 rougher primary flotation cells, or from 1-2 rougher primary flotation cells.

In a further embodiment of the flotation arrangement, a secondary flotation cell is arranged to receive primary overflow from at most two rougher primary flotation cells.

In yet another embodiment of the flotation arrangement, a secondary flotation cell is arranged to receive primary overflow from at most one rougher primary flotation cell.

In yet another embodiment of the flotation arrangement, the further secondary flotation cell is arranged to receive primary overflow from at least two rougher primary flotation cells.

In this way, the overflows of different rougher primary flotation cells are not mixed to a very high degree. Each overflow may then be treated in the best possible way to ensure sufficient treatment, and only a small number of secondary flotation cells acting as recovery cells are needed to achieve a high grade concentrate.

In an embodiment of the flotation arrangement, underflow from the further secondary flotation cell is arranged to flow back into the rougher part of the primary flotation line at a point downstream from the rougher primary flotation cell from which the further secondary flotation cell is arranged to receive primary overflow.

In a further embodiment of the flotation arrangement, underflow from the further secondary flotation cell is arranged to flow back into a further rougher primary flotation cell downstream from the first primary flotation cell from which the further secondary flotation cell is arranged to receive primary overflow.

In yet another further embodiment, underflow from the further secondary flotation cell is arranged to be combined into overflow from at least one further rougher primary flotation cell downstream from the rougher primary flotation cell from which the further secondary flotation cell is arranged to receive primary overflow.

In an embodiment of the flotation arrangement, the secondary flotation line further comprises an additional secondary flotation line comprising at least one additional secondary flotation cell arranged to receive primary overflow from at least one further rougher primary flotation cell.

In a further embodiment of the flotation arrangement, underflow from the further secondary flotation cell is arranged to flow into the additional secondary flotation cell.

In a further embodiment of the flotation arrangement, the first secondary flotation cell is arranged to receive primary overflow from the first rougher primary flotation cell, and the additional secondary flotation cell is arranged to receive primary overflow from at least two further rougher primary flotation cells.

The additional secondary flotation cell may act as a recovery cell. In effect, this kind of arrangement may prevent ore particles comprising valuable mineral from ending up in the tailings flow, thereby further ensuring good recovery of the desired concentrate.

By utilizing an additional secondary flotation cell it may be ensured that all available valuable mineral becomes recovered from the flow of slurry of the primary line into the overflow or concentrate. The loss of ore particles comprising valuable mineral may be minimized, further improving the recovery efficiency of froth the flotation arrangement and plant. Similarly, when using the flotation arrangement in reverse flotation, in the underflow from the primary line, as much of the ore particles comprising valuable material as possible may be recovered. The underflow from the additional secondary flotation cell may be directed to regrinding circuit or step for ensuring recovery of ore particles comprising valuable mineral from that flow of slurry, as well.

Further, the need for pumping may be reduced at the same time as the underflow of secondary flotation line becomes efficiently re-treated. Following this operation with an additional secondary flotation cell acting as a recovery cell, a significant part of the ore particles comprising valuable mineral may be effectively floated. From the primary line, at a location where the high grade concentrate has already been taken out, a sufficient amount of primary overflow may still be collected for efficiently floating the desired concentrate away. In addition, the underflow from the additional secondary flotation cell may be directed into a further processing step. The underflow may be especially suitable for a further grinding step.

By additional secondary flotation cell herein is meant a flotation cell from which the overflow is directed out of the flotation arrangement, for example directly to further processing step such as a grinding step or a frother step. The underflow of the additional secondary flotation cell may be directed back upstream, into the first rougher primary flotation cell of a primary flotation line, or to a rougher primary flotation cell upstream from the rougher primary flotation cell from which the overflow into the additional secondary flotation cell was received; or out of the flotation arrangement, either as tailings flow directed into further treatment outside the flotation arrangement, for example regrinding, or as an infeed into another flotation arrangement for the recovery of a further concentration.

In an embodiment of the flotation arrangement, underflow from a further secondary flotation cell is arranged to flow to the last of the at least one rougher primary flotation cells from which primary overflow to the further secondary flotation cell was received, or to a rougher primary flotation cell downstream of the last of the at least one rougher primary flotation cells from which primary overflow to the further secondary flotation cell was received.

When the underflow from the secondary flotation tanks is returned downstream into the primary line, in the direction of the flow of slurry, energy consumption can be curbed while still achieving very efficient recovery of valuable mineral. It is possible to achieve a high grade for a part of the slurry stream, and at the same time, high recovery for the entire slurry stream passing through the flotation arrangement. Directing the underflow from a secondary flotation cell downstream, energy-intensive pumping may be avoided. Retreatment of the slurry flow in a number of adjoining flotation cells in this manner ensures effective recovery of mineral without any significant increase in energy consumption, as the flows of slurry need not be pumped in energy-consuming ways, but by utilizing the inherent hydraulic head of the downstream flows of slurry within the flotation arrangement and plant. The slurry is returned for further treatment into a position in the flotation arrangement where similar slurry is already being treated. In effect, any pumping required to drive the flow of slurry may be minimized, while the slurry is still being led to multiple treatment stages in the flotation arrangement. Further, slurry fractions with similar or same properties may be combined for further treatment. Primary flotation line underflow combined with a secondary line underflow may have very similar properties, for example the amount of ore particles still comprising valuable mineral, or ore particles of same size distribution. Thus, the operation of the flotation process may be optimized.

In an embodiment of the flotation arrangement, the first secondary flotation cell of the secondary flotation line has a larger volume than the further secondary flotation cell of the secondary flotation line.

The first primary flotation cell may have a concentrate of a higher grade in its overflow than the later primary flotation cells in the primary flotation line. The overflows from those later primary flotation cells may then be treated in smaller secondary flotation cells, having thus a shorter flotation time. This kind of arrangement may ensure a concentrate of a higher grade also from the further secondary flotation cells of the secondary flotation line.

In an embodiment of the flotation arrangement, the further secondary flotation cell of the secondary flotation line has a larger volume than the first flotation cell of the secondary flotation line.

In an embodiment of the flotation arrangement the first rougher primary flotation cell is at least 150 $m^3$ in volume, or at least 500 $m^3$ in volume, or at least 2000 $m^3$ in volume.

In an embodiment of the flotation arrangement, the second rougher primary flotation cell is at least 100 $m^3$ in volume, or at least 300 $m^3$ in volume, or at least 500 $m^3$ in volume.

Utilizing flotation cells with a volumetric size of at least 400 $m^3$ increases the probability of collisions between gas bubbles created into the flotation cells for example by means of a rotor, and the particles comprising valuable mineral, thus improving the recovery rate for the valuable mineral, as well as the overall efficiency of the flotation arrangement. Larger flotation cells have a higher selectivity as more collisions between the gas bubbles and the ore particles may take place due to the longer time the slurry stays in the flotation cell. Therefore most of the ore particles comprising valuable mineral may be floated. In addition, the backdrop of buoyant ore particles may be higher, which means that ore particles comprising very low amount of valuable mineral drop back into the bottom of the flotation cell. Thus the grade of overflow and/or concentrate from larger flotation cells may be higher. These kinds of rougher primary flotation cells may ensure high grade.

In an embodiment of the flotation arrangement, the second rougher primary flotation cell is equal in volume as the first rougher primary flotation cell, or smaller in volume that the first rougher primary flotation cell.

In an embodiment of the flotation arrangement, the first secondary flotation cell in fluid communication with a rougher primary flotation cell is 100-2000 $m^3$ in volume, preferably 400-1000 $m^3$ in volume.

Utilizing flotation cells with a volumetric size of at least 400 $m^3$ increases the probability of collisions between gas bubbles created into the flotation cells for example by means of a rotor, and the particles comprising valuable mineral, thus improving the recovery rate for the valuable mineral, as well as the overall efficiency of the flotation arrangement. As mentioned above, larger flotation cells have a higher selectivity as more collisions between the gas bubbles and the ore particles may take place due to the longer time the slurry stays in the flotation cell. Therefore most of the ore particles comprising valuable mineral may be floated. In addition, the backdrop of buoyant ore particles may be higher, which means that ore particles comprising very low amount of valuable mineral drop back into the bottom of the flotation cell. Thus the grade of overflow and/or concentrate from larger flotation cells may be higher.

In an embodiment of the flotation arrangement, the further secondary flotation cell of the secondary flotation line in fluid communication with a rougher primary flotation cell is 100-2000 $m^3$ in volume, preferably 300-1000 $m^3$ in volume.

Utilizing flotation cells with a volumetric size of at least 300 $m^3$ increases the probability of collisions between gas bubbles created into the flotation cells for example by means of a rotor, and the particles comprising valuable mineral, thus improving the recovery rate for the valuable mineral, as well as the overall efficiency of the flotation arrangement.

In an arrangement where there is a secondary flotation line cleaning the overflow of a rougher primary flotation cell, and where underflow from that secondary flotation line is led back to a later rougher primary flotation cell downstream, it is important to get a higher grade from the rougher primary flotation cell than to get a high recovery of ore particles comprising valuable mineral in the overflow of the rougher primary flotation cell. This is because the underflow from the secondary flotation line may be re-treated in the primary flotation line where any remaining ore particles comprising valuable mineral are then recovered. While some valuable material is directed back into the primary flotation line, the energy required by pumping the underflow back into the primary flotation line is not crucial, as the later rougher primary flotation cells guarantee that recovery is made. Therefore very large flotation cells of up to 2000 $m^3$ in volume may be used. Using flotation cells larger than 1000 $m^3$ may, however, not always be preferable, since it is hard to achieve efficient mixing into a cell that large. Without efficient mixing, ore particles comprising relatively small amounts of valuable mineral drop back into the bottom of the flotation cell, which may affect the recovery rate negatively.

With a flotation arrangement of the above embodiments, it may be possible to produce or recover at least some part of the concentrate with very high grade.

In case the first rougher primary flotation cells have a relatively large volume, there may be no need for large subsequent flotation cells, but rather, the flotation cells (primary or secondary) downstream from the first rougher primary cell or cells may be smaller and therefore more efficient. In flotation processes of certain minerals, it may be easy to float a significant part of the ore particles comprising valuable mineral with high grade. In that case it may be possible to have flotation cells of smaller volume downstream in the primary flotation line and still achieve high recovery rate.

In an embodiment of the flotation arrangement, the volume of the first secondary flotation cell in fluid communication with at least one rougher primary flotation cell is 2-50% of the aggregate volume of the at least one rougher primary flotation cell, preferably 3-30% of the aggregate volume of the at least one primary flotation cell.

In an embodiment of the flotation arrangement, the volume of the further secondary flotation cell of the secondary line in fluid communication with at least one rougher primary flotation cell is 2-50% of the aggregate volume of the at least one rougher primary flotation cell, preferably 3-30% of the aggregate volume of the at least one rougher primary flotation cell.

By aggregate volume herein is meant the combined volume of the rougher primary flotation cells from which a secondary flotation cell receives primary overflow. For example, the further secondary flotation cell may receive primary overflows from more than one rougher primary flotation cell of the primary flotation line. In that case, the aggregate volume is the combined volume of the rougher primary flotation cells.

In such embodiments, a part of the concentrate is produced with high grade. When the secondary flotation cells of the secondary flotation line or lines are smaller, the residence time of ore particles within the flotation cell is lower, i.e. there is less time to float the desired concentrate. The thus achieved concentrate has therefore a higher grade.

Constructing the secondary flotation cell or cells of the secondary flotation line in the direction of the slurry flow smaller than the flotation cell or cells in the primary flotation line might provide efficiency benefits. The effect might be especially pronounced if the flotation cell or flotation cells in the secondary flotation line are at least 10% smaller than in the primary flotation line. For example, it is possible that the at least one flotation cell of the secondary flotation line is at least 20 or 30% smaller than the at least one primary flotation cell of the primary flotation line.

In an embodiment of the flotation arrangement, the flow of slurry between at least two flotation cells in fluid connection is driven by gravity.

In a further embodiment of the flotation arrangement, the flow of slurry between the first rougher primary flotation cell and a further rougher primary flotation cell is driven by gravity.

In a further embodiment of the flotation arrangement, the flow of slurry between the first secondary flotation cell and a further secondary flotation cell is driven by gravity.

In a further embodiment of the flotation arrangement, the flow of slurry between a rougher primary flotation cell and a secondary flotation cell in fluid connection with the rougher primary flotation cell is driven by gravity.

In yet another embodiment of the flotation arrangement, the flow of slurry between the first rougher primary flotation cell and the first secondary flotation cell is driven by gravity.

In a further embodiment of the flotation arrangement, the flow of slurry between a further rougher primary flotation cell and a further secondary flotation cell is driven by gravity.

By arranging the flow of slurry be driven by gravity, savings in energy consumption may be achieved as no additional pumping is required to drive the slurry downstream.

By avoiding energy-intensive pumping in flotation arrangement, significant savings in energy may be achieved, while, at the same time, ensuring efficient recovery of valuable mineral material from ores of poor quality, i.e. comprising even very little valuable mineral to start with. It may be possible to produce some part of the concentration with high grade, but also, at the same time have a good overall recovery of the desired valuable mineral. Only insignificant amounts of the valuable mineral may end up in the tailing flow.

The invention at hand aims at improving the mineral recovery process while decreasing energy consumption of the process. This is made possible by utilizing the inherent flows of slurry of the process, i.e. by moving the slurry flow into retreatment in downstream flotation cells. By arranging the flotation process thus, it is possible to direct the flow of slurry by gravity. In some embodiments, the flow of slurry may also be directed by low-intensity pumping, or by a suitable combination of the two, that is, gravity and low-intensity pumping. For example, it is possible to handle the flow of slurry by a low-head pump or gravity, when the underflow from a further secondary flotation cell is arranged to flow to the last one of the rougher primary flotation cells from which the primary overflow was received, or to a rougher primary flotation cell downstream of the last of the at least one primary flotation cells from which the primary overflow was received.

By low-head pump herein is meant any type of pump producing a low pressure for driving a flow of slurry downstream. Typically, a low-head pump produces a maximum head of up to 1.0 meters, i.e. may be used to drive the flow of slurry between two adjoining flotation cells with less than 30 cm difference in slurry surface level. A low-head pump may typically have an impeller for creating an axial flow.

In an embodiment of the flotation arrangement, primary overflow from at least one scavenger primary flotation cell is arranged to flow directly into a regrinding step.

In a further embodiment of the flotation arrangement, the combined primary overflow from the scavenger flotation cells is arranged to flow directly into a regrinding step.

In an embodiment of the flotation arrangement, the combined secondary overflows of the at least two secondary flotation cells is arranged to flow into a further processing step.

In an embodiment of the flotation arrangement, underflow from the last scavenger primary flotation cell is arranged to flow into a further processing step, or to leave the flotation arrangement as tailings.

In an embodiment of the flotation arrangement, underflow from the last secondary flotation cell of the secondary flotation line is arranged to flow into a further processing step, or to leave the flotation arrangement as tailings.

In a further embodiment of the flotation arrangement, the further processing step comprises at least one step selected from: a grinding step, a conditioning step, a flotation step.

By further processing herein is meant any suitable process step such as a grinding step or a chemical addition step, or any other process step typically utilized in connection with a flotation arrangement, and known to a person skilled in the art. The grinding step may comprise at least one grinding mill, which may be any suitable grinding mill as is known by a person skilled in the art.

In an embodiment of the flotation arrangement, the flotation arrangement comprises two primary flotation lines, and the first secondary flotation cell of the secondary flotation line is arranged to receive overflow from the first rougher primary flotation cells of both primary flotation lines.

In such arrangements, it may be possible to have a higher volume of slurry inflow into a secondary flotation line. Therefore it may be feasible to utilize flotation cells of larger volume also in the secondary line, benefits of which, mostly relating to efficiency, have already been discussed earlier in this disclosure.

In an embodiment of the flotation arrangement, the primary flotation cells and/or the secondary flotation cells comprise a froth flotation cell.

In an embodiment of the flotation arrangement, a third rougher primary flotation cell, and any subsequent rougher primary flotation cell after the third rougher primary flotation cell, comprises a froth flotation cell.

In a further embodiment of the flotation arrangement, the first rougher primary flotation cell and a second rougher primary flotation cell of the primary flotation line are operated as overflow flotation cells.

In a further embodiment of the flotation arrangement, flotation gas is fed into the flotation cell where the slurry is separated into the overflow and the underflow.

In a further embodiment of the flotation arrangement, the flotation cell into which flotation gas is fed comprises a mixer.

In a further embodiment of the flotation arrangement, flotation gas is fed into a preparation flotation cell into which a mixer is arranged. By preparation flotation cell herein is meant a flotation vessel in which the slurry may be prepared for floating, typically by introducing flotation gas and by employing mechanical agitation, prior to the slurry being led into a second vessel where the actual flotation process takes place. The preparation flotation cell may, for example, be the first vessel of a dual flotation cell described earlier in this disclosure.

In an embodiment of the flotation arrangement, the mineral ore particles comprise Cu, or Zn, or Fe, or pyrite, or metal sulfide such as gold sulfide. Mineral ore particles comprising other valuable mineral such as Pb, Pt, PGMs (platinum group metals Ru, Rh, Pd, Os, Ir, Pt), oxide mineral, industrial minerals such as Li (i.e. spodumene), petalite, and rare earth minerals may also be recovered, according to the different aspects of the present invention.

An embodiment of the use of a flotation arrangement according to the invention is particularly intended for recovering mineral ore particles comprising a valuable mineral from low grade ore.

An embodiment of the use of a flotation arrangement according to the invention is intended for recovering mineral ore particles comprising Cu from low grade ore.

An embodiment of the use of a flotation arrangement according to the invention is intended for a flotation arrangement wherein the first rougher primary flotation cell is at least 150 m$^3$ in volume, or at least 500 m$^3$ in volume, or at least 2000 m$^3$ in volume, and wherein the flow of slurry is driven by gravity.

An embodiment of the use of a flotation arrangement according to the invention is intended for a flotation arrangement wherein the second rougher primary flotation cell is at least 100 m$^3$ in volume, or at least 300 m$^3$ in volume, or at least 500 m$^3$ in volume, and wherein the flow of slurry is driven by gravity.

An embodiment of the use of a flotation arrangement according to the invention is intended for a flotation arrangement wherein flow of slurry between the primary flotation cells of the primary flotation line is driven by gravity.

An embodiment of the use of a flotation arrangement according to the invention is intended for a flotation arrangement wherein flow of slurry between the secondary flotation cells of the secondary line is driven by gravity.

An embodiment of the use of a flotation arrangement according to the invention is intended for a flotation arrangement wherein flow of slurry between a rougher primary flotation cell and a secondary flotation cell in fluid connection with the rougher primary flotation cell is driven by gravity.

An embodiment of the use of a flotation arrangement according to the invention is intended for a flotation arrangement wherein flow of slurry between the first rougher primary flotation cell and the first secondary flotation cell is driven by gravity.

An embodiment of the use of a flotation arrangement according to the invention is intended for a flotation arrangement wherein flow of slurry between a further rougher primary flotation cell and a further secondary flotation cell of the secondary flotation line is driven by gravity.

An embodiment of the use of a flotation arrangement according to the invention is intended for recovering mineral ore particles comprising Fe by reverse flotation.

In an embodiment of the flotation plant, the plant comprises at least two, or at least three flotation arrangements according to the invention.

In an embodiment of the flotation plant, the plant comprises at least one first flotation arrangement for the recovery of a first concentrate and at least one second flotation arrangement for the recovery of a second concentrate.

In an embodiment of the flotation plant, the primary flotation cells of the at least one first flotation arrangement for the recovery of the first concentrate and the primary flotation cells of the at least one second flotation arrangement for the recovery of the second concentrate are arranged in series.

In an embodiment of the flotation plant, the plant further comprises an arrangement for further treating mineral ore particles suspended in slurry so that the second concentrate differs from the first concentrate.

In an embodiment of the flotation plant, the arrangement for further treating mineral ore particles suspended in slurry comprises a grinding step, disposed between a first flotation arrangement and a second flotation arrangement.

In this case, the second concentrate recovered from the second flotation arrangement may have a similar mineralogy as the first concentrate recovered from the first flotation arrangement, but the particle size distribution of the slurry being led into the second flotation arrangement after the grinding step may be different.

In an embodiment of the flotation plant, the plant for further treating mineral ore particles suspended in slurry comprises an arrangement for the addition of flotation chemicals, disposed between a first flotation arrangement and a second flotation arrangement.

In this case, the second concentrate recovered from the second flotation arrangement may have a different mineralogy from the first concentrate recovered from the first flotation arrangement, the use of flotation chemicals utilized determined naturally by the desired valuable mineral intended to be recovered by the second flotation arrangement.

In an embodiment of the flotation plant, a flotation arrangement is arranged to recover mineral ore particles comprising Cu, and/or Zn, and/or pyrite, and/or a metal from a sulfide, such as gold.

In an embodiment of the flotation plant, the flotation arrangement is arranged to recover mineral ore particles comprising Cu from low grade ore.

For example, in recovering copper from low grade ores obtained from poor deposits of mineral ore, the copper amounts may be as low as 0.1% by weight of the feed, i.e. infeed of slurry into the flotation arrangement. The flotation arrangement according to the invention may be very practical for recovering copper, as copper is a so-called easily floatable mineral. In the liberation of ore particles comprising copper, it may be possible to get a relatively high grade from the first primary flotation cells without any extra pumping between the flotation cells.

By using the flotation arrangement according to the present invention, the recovery of such low amounts of valuable mineral, for example copper, may be efficiently increased, and even poor deposits cost-effectively utilized. As the known rich deposits have increasingly already been used, there is a tangible need for processing the less favourable deposits as well, which previously may have been left unmined due to lack of suitable technology and processes for recovery of the valuable material in very low amounts in the ore.

In a further embodiment of the flotation plant, a flotation arrangement is arranged to recover Fe by reverse flotation.

In reverse flotation, mineral ore particles comprising undesirable material are removed from the slurry by arranging the gas bubbles to adhere to those particles and removing them from the flotation cell in the overflow, whereas the valuable mineral material comprising ore particles are recovered in the underflow, thus inversing the conventional flotation flows of accept into overflow and reject into underflow. Typically in reverse flotation of Fe, the large mass pull of invaluable material, most commonly silicates, may cause significant problems in controlling the flotation process. Inevitably, some of the mineral ore particles comprising valuable Fe end up into the overflow (especially fine, light particles). By directing this overflow into a secondary flotation line for retreatment, at least some of the mineral ore particles comprising Fe can be processed into the underflow of the secondary flotation line and thus recovered.

Similarly, treatment of slurries for the recovery of such industrial minerals as bentonite, silica, gypsum, or talc, may be improved by using reverse flotation in the same manner as for Fe. In recovering industrial minerals, the goal of flotation may be, for example, the removal of dark particles into the overflow reject, and recovery of white particles into the underflow accept. In that kind of process, some of the lighter, finer white particles may end up into the overflow. Those particles could be efficiently recovered by the invention according to the present disclosure.

In an embodiment of the flotation method according to the invention, the slurry is subjected to at least four primary flotation stages, or to 3-10 primary flotation stages, or to 4-7 primary flotation stages.

In an embodiment of the flotation method, the slurry is subjected to at least two secondary flotation stages, or to 2-10 secondary flotation stages, or to 4-7 secondary flotation stages.

In an embodiment of the flotation method, primary overflow from 1-3 rougher flotation stages, or from 1-2 rougher flotation stages is directed to a secondary flotation stage.

In an embodiment of the flotation method, primary overflow from at least one further rougher flotation stage, and secondary underflow from the further secondary flotation stage are directed to an additional secondary flotation stage of secondary flotation.

In a further embodiment of the flotation method, primary overflow from a first rougher flotation stage is directed to a first secondary flotation stage, and primary overflow from at least two further rougher flotation stages is directed to the additional secondary flotation stage.

In an embodiment of the flotation method, underflow from a secondary flotation stage is directed to primary flotation in the last of the at least one rougher flotation stage from which the primary overflow was received, or to a rougher flotation stage downstream of the last of the at least one rougher flotation stage from which the primary overflow was received.

In an embodiment of the flotation method, froth flotation is employed in at least one primary flotation stage and/or at least one secondary flotation stage.

In an embodiment of the flotation method, overflow flotation is employed in the first rougher flotation stage, or in the first rougher flotation stage and in a second rougher flotation stage.

BRIEF DESCRIPTION OF THE DRAWINGS

The accompanying drawings, which are included to provide a further understanding of the current disclosure and which constitute a part of this specification, illustrate embodiments of the disclosure and together with the description help to explain the principles of the current disclosure. In the drawings:

FIG. 4a is a flow chart illustration for a detail of the embodiment in FIG. 1a.

FIG. 4b is a simplified schematic perspective projection for the embodiment of FIG. 4a.

FIG. 4c is a flow chart illustration for an alternative detail of the embodiment in FIG. 1a.

FIG. 5b is a simplified schematic perspective projection for the embodiment of FIG. 5a.

FIG. 5c is a simplified illustration showing the relative vertical placement of flotation cells as seen from the direction of the secondary flotation cells of FIG. 5a.

FIG. 6b is a simplified schematic perspective projection for the embodiment of FIG. 6a.

FIG. 6c is a simplified illustration showing the relative vertical placement of flotation cells as seen from the direction of the secondary flotation cells of FIG. 6a.

FIG. 7 is a flow chart illustration for a detail of an embodiment of the invention.

FIG. 8 is a flow chart illustration for a detail of an embodiment of the invention.

FIG. 9 is a flow chart illustration for a detail of an embodiment of the invention.

FIG. 10 is a flow chart illustration for a detail of an embodiment of the invention.

DETAILED DESCRIPTION

Reference will now be made in detail to the embodiments of the present disclosure, an example of which is illustrated in the accompanying drawing.

The description below discloses some embodiments in such a detail that a person skilled in the art is able to utilize the arrangement, plant and method based on the disclosure. Not all steps of the embodiments are discussed in detail, as many of the steps will be obvious for the person skilled in the art based on this disclosure.

For reasons of simplicity, item numbers will be maintained in the following exemplary embodiments in the case of repeating components.

Figure 14:
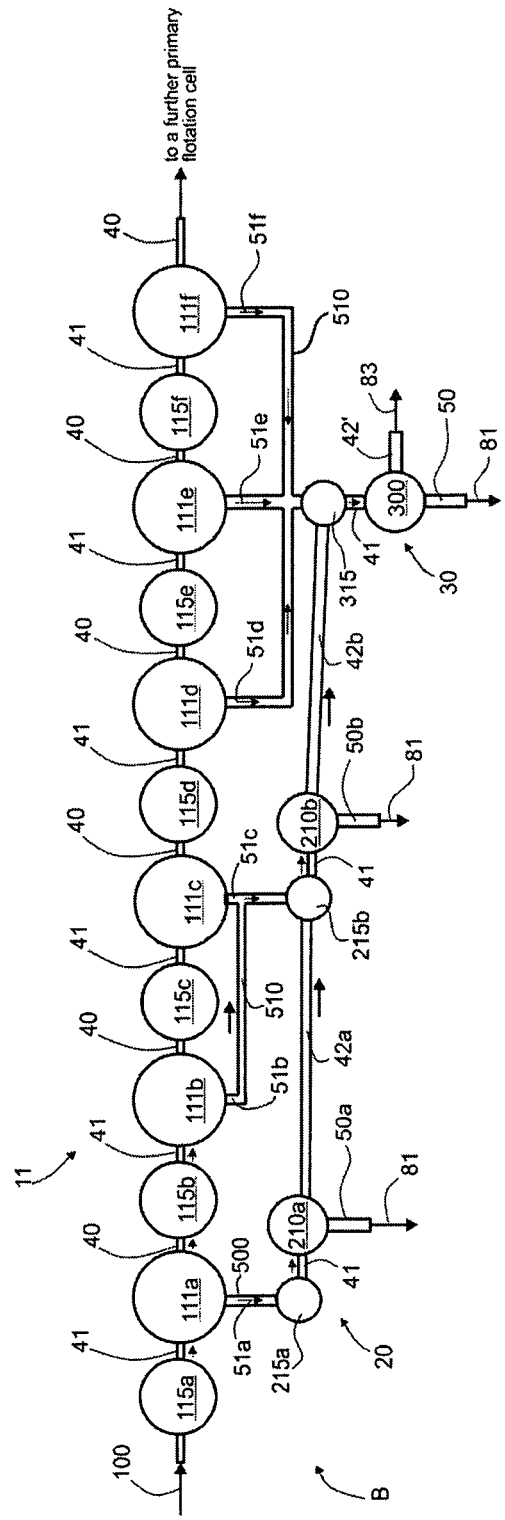
FIG. 14 is a flow chart illustration for a detail of an embodiment of the invention.
Figure 15:
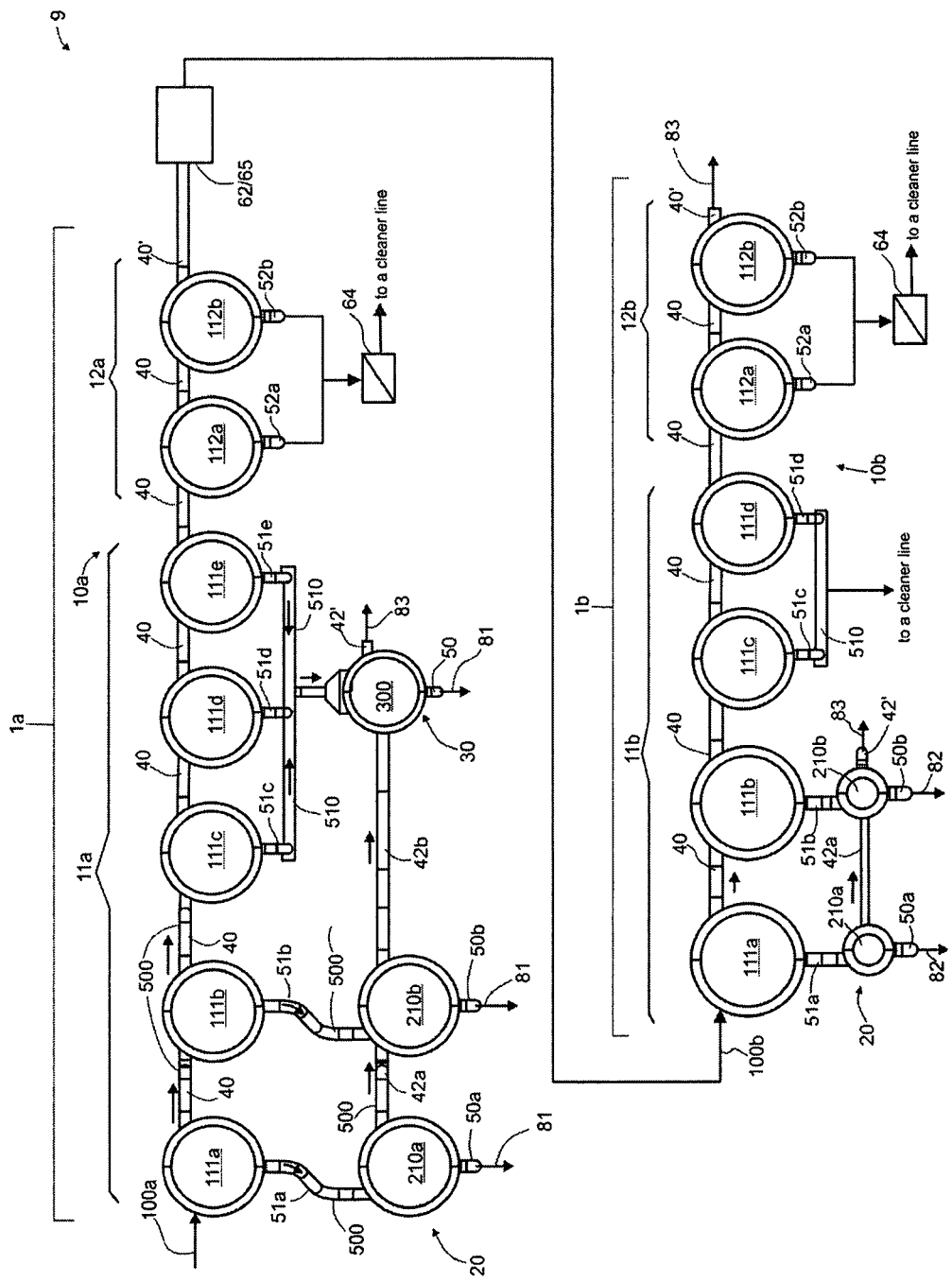
FIG. 15 is a flow chart illustration for an embodiment of a flotation plant according to the invention.
Figure 16:
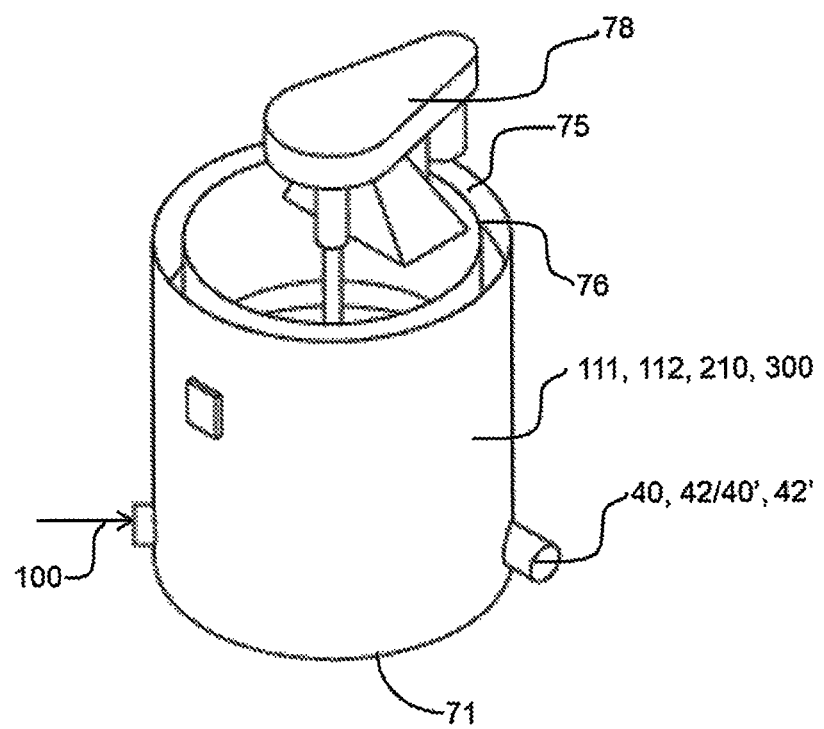
FIG. 16 is a simplified schematic perspective projection of a flotation tank.

The enclosed FIGS. 1a-14 illustrate a flotation arrangement 1 or detail parts A, B of the flotation arrangement 1, and FIG. 15 illustrates a flotation plant 9 in a schematic manner. In FIG. 16, a flotation cell is presented in some detail. The figures are not drawn to proportion, and many of the components of the flotation cell, the flotation arrangement 1 and the flotation plant 9 are omitted for clarity. In order to fit a figure on a single drawing page, some of the connections between flotation cells, flotation lines or flotation arrangements are presented as graphic lines of disproportional lengths rather than connections of actual dimensions in proportion. The forward direction of flows of slurry is shown in the figures by arrows.

Although flotation is disclosed in the following examples by reference mostly to froth flotation, it should be noted that the principles according to the invention can be implemented regardless of the specific type of the flotation, i.e. the flotation technique can be any of the known per se flotation techniques, such as froth flotation, dissolved air flotation or induced gas flotation.

The basic operational principle of the flotation arrangement 1 is presented in FIGS. 1a-b, 2, 3 and 4a-c. The following description is to be read mainly in relation to those figures unless otherwise stated.

A first rougher primary flotation cell 111a of a primary flotation line 10 receives a flow of suspension, that is, a slurry inflow 100 comprising ore particles, water and, in some instances, flotation chemicals such as collector chemicals and non-collector flotation reagents for separating the slurry into an underflow 40 and an overflow 51a. A typical flotation cell 111, 112, 210, 300 is presented in FIG. 16. The flotation cell may comprise a mixer 78 in the form of a mechanical agitator as is shown in FIG. 16, or any other suitable mixer for promoting the collisions between flotation gas bubbles and ore particles. In an embodiment, flotation gas may be fed or introduced into the flotation cell where the slurry is separated into overflow and underflow. In an embodiment, flotation gas may be fed into a part of the flotation cell into which a mixer is arranged, i.e. into a preparation flotation cell preceding a flotation cell in which the ore particles are floated and thus separated into overflow and underflow.

In a flotation process where conventional flotation with flotation chemicals is employed, a similar process of froth flotation takes place: the collector chemical molecules adhere to surface areas on ore particles having the valuable mineral, through an adsorption process. The valuable mineral acts as the adsorbent while the collector chemical acts as the adsorbate. The collector chemical molecules form a film on the valuable mineral areas on the surface of the ore particle. The collector chemical molecules have a non-polar part and a polar part. The polar parts of the collector molecules adsorb to the surface areas of ore particles having the valuable minerals. The non-polar parts are hydrophobic and are thus repelled from water. The repelling causes the hydrophobic tails of the collector molecules to adhere to flotation gas bubbles. An example of a flotation gas is atmosphere air pumped to flotation cell. A sufficient amount of adsorbed collector molecules on sufficiently large valuable mineral surface areas on an ore particle may cause the ore particle to become attached to a flotation gas bubble. It is also conceivable that the flotation process may be performed without flotation chemicals. It is also possible to perform the flotation process as reverse flotation. In the following, most of the examples are disclosed in view of conventional flotation, unless stated that the examples specifically relate to reverse flotation. All of the embodiments and examples given may, however, be realized in a reverse flotation process as well.

Ore particles become attached or adhered to gas bubbles to form gas bubble-ore particle agglomerates. These agglomerates rise to the surface of the flotation cells 111, 112, 210, 300 at the uppermost part of the cell by buoyancy of the gas bubbles, as well as with the continuous upwards flow of slurry which may be induced by both mechanical agitation and the infeed of slurry into the cell 111, 112, 210, 300.

The gas bubbles may form a layer of froth. Froth gathered to a surface of slurry in the flotation cell 111, 112, 210, 300, comprising the gas bubble-ore particle agglomerates is let to flow out of flotation cell 111, 112, 210, 300, over a launder lip 76 and into a launder 75. It is also conceivable that the flotation cells are used as so-called overflow flotation cells where no continuous coherent layer of froth is formed on the slurry surface but actual slurry comprising ore particles with valuable minerals floated in the flotation cell is driven over the launder lip 76.

From the surface of the slurry at the top part of a rougher primary flotation cell 111a, 111b, the valuable mineral containing ore particles overflow the launder lip 76 of the flotation cell to be collected into the launder 75. In the case of reverse flotation, naturally, the ore particles not containing valuable mineral are collected into the overflow, while the ore particles containing the valuable mineral become recovered via an underflow.

This fraction of the slurry is called primary overflow 51a, 51b. From a secondary flotation cell 210a, 210b, overflow 50a, 50b is collected in the same way. By a launder lip 76 is herein meant the peripheral edge of a flotation cell 111, 112, 210, 300 at the upper part of the cell over which froth overflow with valuable material particles flows to the launder 75.

The overflow 50a, 50b from secondary flotation line 20 is recovered as a first concentrate 81. The first concentrate 81 of ore particles comprising valuable mineral is in a form of a fluid which is led to further flotation lines or stages according to embodiments of the invention, or to other further treatment according to solutions known in the art.

From the area located close to a flotation cell bottom 71, a gangue or a part of the slurry containing ore particles that do not rise onto the surface of the slurry is led out of the rougher primary flotation cell 111a as underflow 40. Underflow 40 is led into a subsequent rougher primary flotation cell 111b that receives underflow 40 as an infeed from the previous rougher primary flotation cell 111a. The slurry is treated in the subsequent rougher primary flotation cell 111b similarly as in the first rougher primary flotation cell 111a, in a manner well known to a person skilled in the art.

The primary flotation line 10 comprises a rougher part 11 with at least two rougher primary flotation cells 111a, 111b connected in series an arranged in fluid communication, followed by a scavenger part 12 with at least two scavenger primary flotation cells 112a, 112b connected in series and arranged in fluid communication. The last rougher primary flotation cell 111e is connected in series and arranged in fluid communication with the first scavenger primary flotation cell 112a, the rougher primary flotation cells 111 of the rougher part 11 and the scavenger primary flotation cells 112 of the scavenger part 12 thereby comprising a continuous treatment line. Overflow 51a from the first rougher primary flotation cell 111a may be arranged to flow directly into a secondary flotation line 20, 30.

Figure 2:
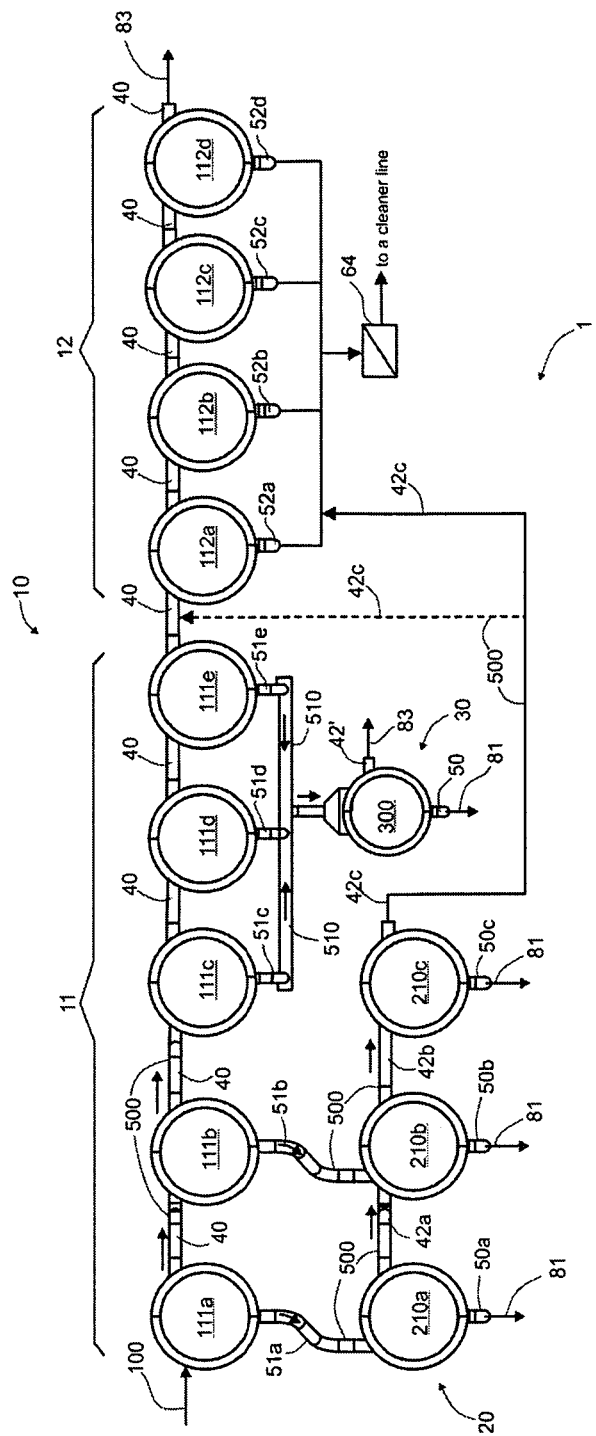
FIG. 2 is a flow chart illustration for an embodiment of the invention.
Figure 3:
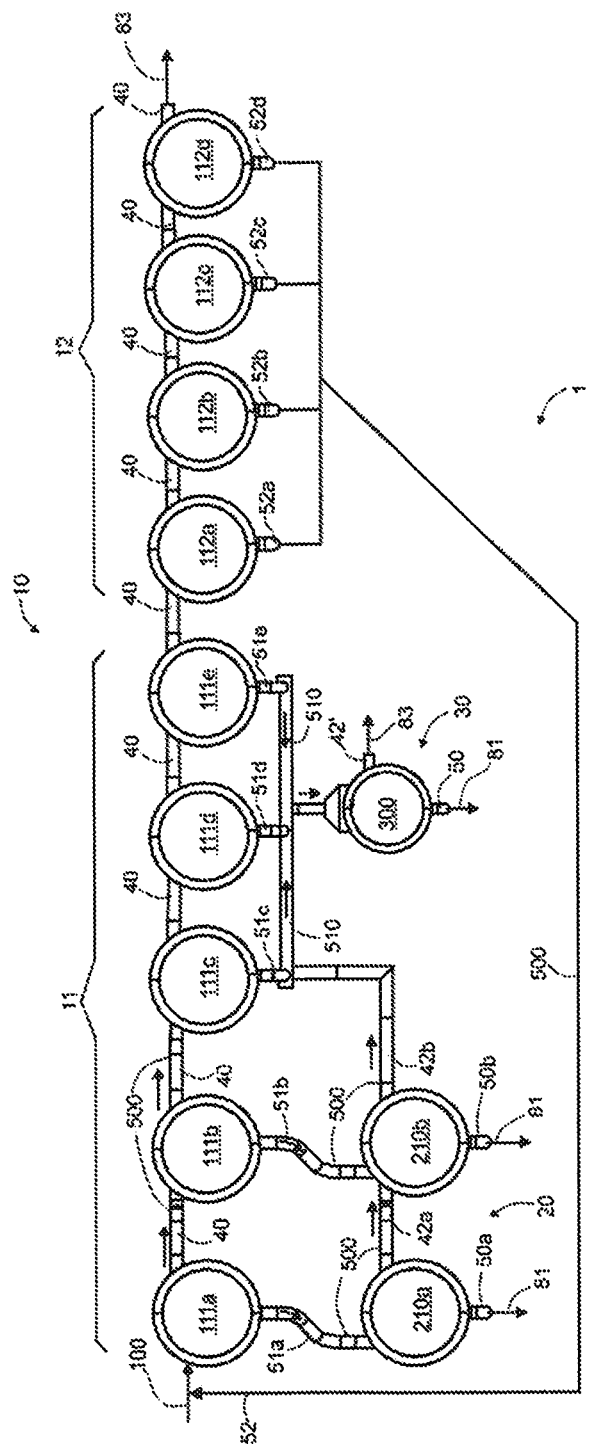
FIG. 3 is a flow chart illustration for an embodiment of the invention.

Overflow 52 from the scavenger primary flotation cells 112a-d is arranged to flow back into a rougher flotation cell 111a-f (see FIG. 3). Alternatively, overflow 52 from the scavenger primary flotation cells 112a-d may be arranged to flow into a regrinding step 64 and then into a scavenger cleaner flotation line (see FIGS. 1a, 1b, 2).

Primary overflow 52 from at least one scavenger primary flotation cell 112 may be arranged to flow directly into a regrinding step 64. In an embodiment, the combined primary overflow from the scavenger primary flotation cells 112 of the scavenger part 12 may be arranged to flow directly into a regrinding step 64.

The primary line 10 may comprise at least four primary flotation cells 111, 112. Alternatively, the primary flotation line 10 may comprise 4-10 primary flotation cells 111, 112. Alternatively, the primary flotation line 10 may comprise 4-7 primary flotation cells 111, 112. The rougher part 11 may comprise at least two rougher primary flotation cells 111a, lib. Alternatively, the rougher part 11 may comprise 2-6 rougher primary flotation cells 111a-f. Alternatively, the rougher part 11 may comprise 2-4 rougher primary flotation cells 111a-d. The scavenger part 12 may comprise at least two scavenger primary flotation cells 112a-b. Alternatively, the scavenger part 12 may comprise 2-6 scavenger primary flotation cells 112a-d. Alternatively, the scavenger part 12 may comprise 2-4 scavenger primary flotation cells 112a-d. Embodiments of the invention, comprising different numbers of primary flotation cells in the primary flotation line 10 are introduced in the "Examples" section of this disclosure.

The rougher and/or scavenger primary flotation cells 111a-f, 112a-d are connected in series. The fluid connection may be realized by a conduit 500 (pipe or tube, as is shown in the figures) so that the subsequent primary flotation cells 111a-f, 112a-d are arranged at a distance from each other. Alternatively, any two adjoining or subsequent primary flotation cells 111a-f, 112a-d may be arranged into direct cell connection so that no separate conduit between the two flotation cells 111a-e, 112a-e is needed (not shown in figures).

In embodiments of the invention, where the primary flotation line 10 comprises more than two rougher primary flotation cells 111a-f, all of the adjoining or subsequent primary flotation cells 111a-f, 112a-d may be arranged into fluid connection with conduits 500 arranged between the flotation cells for directing an underflow 40 from one flotation cell to the next flotation cell. Alternatively, all of the flotation cells 111a-f, 112a-d may be arranged into direct cell connection with the adjoining flotation cells. Alternatively, some of the adjoining flotation cells 111a-f, 112a-d may arranged in direct cell connection with the neighboring flotation cells, while other adjoining flotation cells may have a conduit 500 for realizing the fluid connection. The arrangement and design of the primary flotation line 10 may depend on the overall process requirements and physical location of the flotation arrangement 1.

Further, the first secondary flotation cell 210a of the secondary flotation line 20, as well as a further secondary flotation cell 210b of the secondary flotation line 20 may be arranged in direct fluid communication with the first rougher primary flotation cell 111a, 111b from which the secondary flotation cell 210a, 210b receives the overflow 51a, 51b, i.e. there are no further processing steps such as a grinding step or a conditioning step arranged between the primary flotation line 10 and the secondary flotation line 20.

From the last scavenger primary flotation cell 112d of the flotation line 10, underflow 40' (which may be reject in normal flotation, or accept in reverse flotation) is led out of the flotation arrangement 1 as a tailings flow 83 which may be further treated in any suitable manner known in the art.

The first rougher primary flotation cell 111a may be at least 150 m$^3$ in volume. Alternatively, the first rougher primary flotation cell 111a may be at least 500 m$^3$ in volume. Alternatively, the first rougher primary flotation cell 111a may be at least 2000 m$^3$ in volume.

The second rougher primary flotation cell 111b, or any one of the subsequent rougher primary flotation cells 111b-f downstream of the first rougher primary flotation cell 111a, may be at least 100 m$^3$ in volume. Alternatively, the second rougher primary cell 111b, or any one of the subsequent rougher primary flotation cells 111b-f downstream of the first rougher primary flotation cell 111a, may be at least 300 m$^3$ in volume. Alternatively, the second rougher primary cell 111b, or any one of the subsequent rougher primary flotation cells 111b-f downstream of the first rougher primary flotation cell 111a, may be at least 500 m$^3$ in volume.

Figure 11:
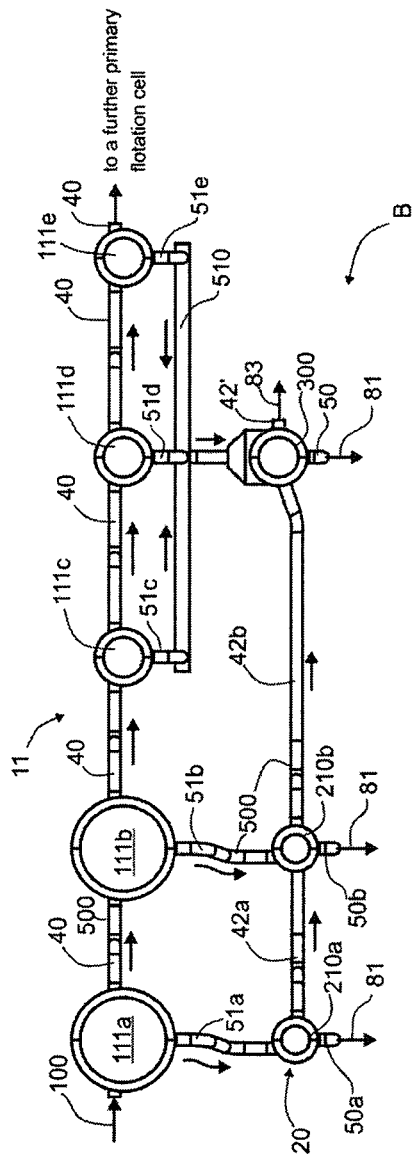
FIG. 11 is a flow chart illustration for a detail of an embodiment of the invention.
Figure 12:
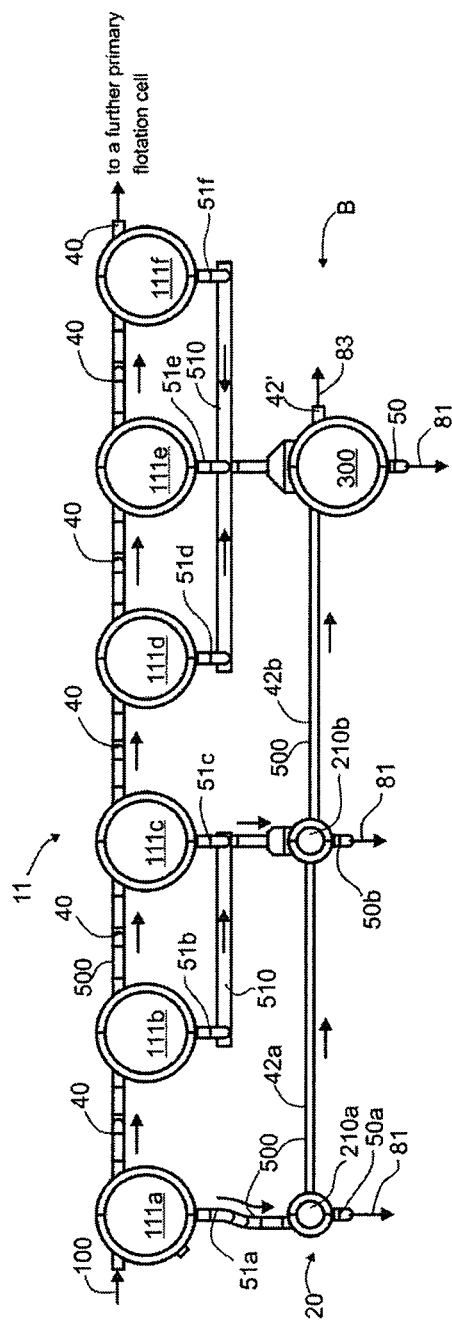
FIG. 12 is a flow chart illustration for a detail of an embodiment of the invention.

In embodiments of the invention, the second primary flotation cell 111b, some of the of the subsequent rougher primary flotation cells 111b-f downstream of the first rougher primary flotation cell 111a, or all of the of the subsequent rougher primary flotation cells 111b-f downstream of the first rougher primary flotation cell 111a, may be equal in volume as the first rougher primary flotation cell 111a (see FIG. 12). In embodiments of the invention, the second primary flotation cell 111b, some of the of the subsequent rougher primary flotation cells 111b-f downstream of the first rougher primary flotation cell 111a, or all of the of the subsequent rougher primary flotation cells 111b-f downstream of the first rougher primary flotation cell 111a, may be smaller in volume than the first primary flotation cell 111a (see FIG. 11).

The primary overflow 51a from the first rougher primary flotation cell 111a is directed to a first secondary flotation cell 210a of the secondary flotation line 20. The first secondary flotation cell 210a is arranged in direct fluid communication with at least one first rougher primary flotation cell 111a. The first secondary flotation cell 210a is arranged to receive primary overflow 51a of the at least one first rougher primary flotation cell 111a as inflow, for the recovery of a first concentrate 81 comprising ore particles with valuable mineral or minerals. The first secondary flotation cell 210a, as well as any other secondary flotation cells, operates on standard flotation principles, as described earlier in this disclosure. An overflow 50a of the first secondary flotation cell 210a is collected as the first concentrate 81, which may then be led to any suitable further processing step known in the art.

The secondary flotation line 20 comprises at least two secondary flotation cells 210 in fluid communication. In an embodiment, the secondary flotation line 20 may comprise 2-10 secondary flotation cells 210a-210j in fluid communication. In an embodiment, the secondary flotation line 20 may comprise 4-7 secondary flotation cells 210a-g. In another embodiment, the secondary flotation line 20 may comprise three secondary flotation cells 210a-c.

In the secondary flotation line 20, the first secondary flotation cell 210a is arranged in fluid communication with at least one rougher primary flotation cell 111a, and arranged to receive primary overflow 51a from the at least one rougher primary flotation cell 111a for the recovery of a first concentrate 81. A further secondary flotation cell 210b is arranged in fluid communication with at least one further rougher primary flotation cell 111b, and arranged to receive primary overflow 51b from the at least one further rougher primary flotation cell 111b for the recovery of a first concentrate 81. The further secondary flotation cell 210b is arranged in fluid communication with a previous secondary flotation cell 210a.

The further secondary flotation cells 210b-c of a secondary flotation line 20 may be arranged in direct cell connection with each other, or they may be arranged in fluid connection with each other via a conduit or conduits 500. In an embodiment, all of the adjoining secondary flotation cells 210a-c of a secondary flotation line 20 may be arranged in direct cell connection with each other; alternatively, all of the adjoining secondary flotation cells 210a-c may be arranged in fluid connection via conduits 500; alternatively, some of the adjoining secondary flotation cells 210a-c may be arranged in direct cell connection, while other may be arranged to have a conduit 500 between them, similarly to what has been described in connection with the primary flotation line 10.

Figure 4A:
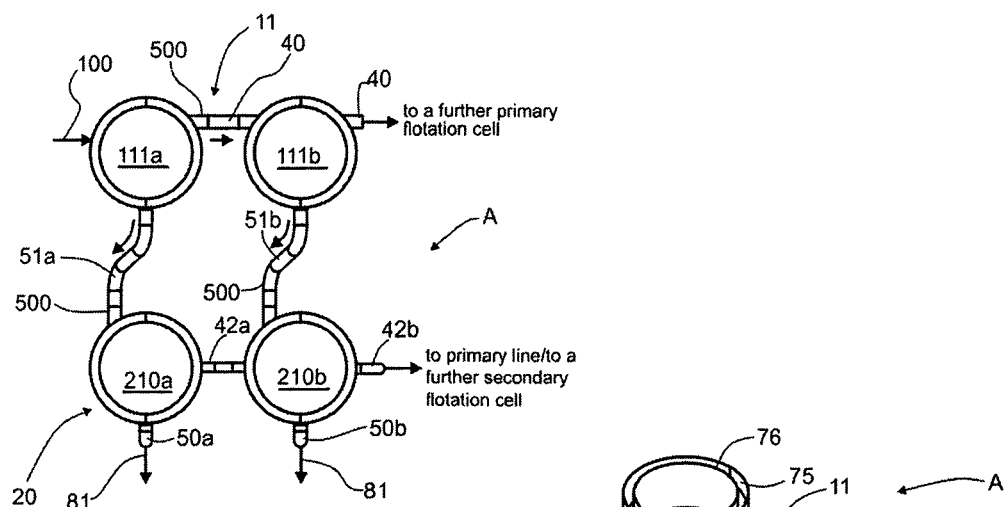
Figure 4B:
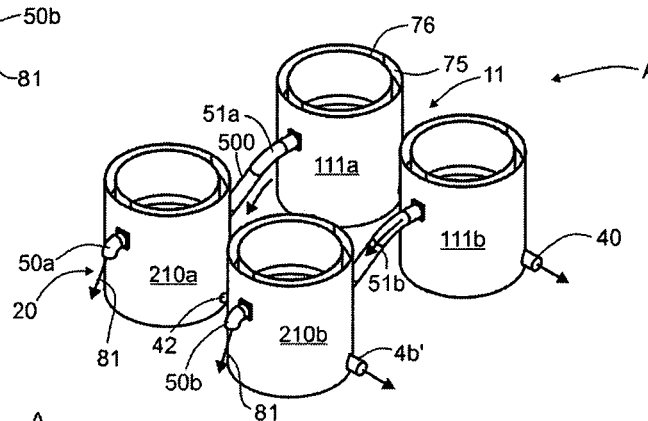
Figure 4C:
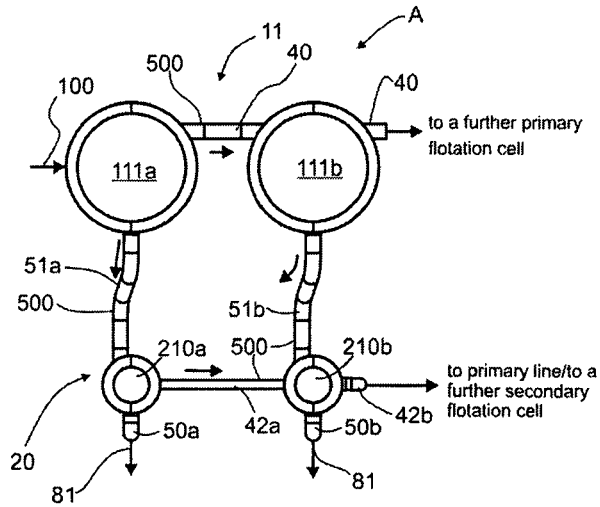

In an embodiment as depicted in FIG. 4a, secondary underflow 42a from the first secondary flotation cell 210a may arranged to flow to a further secondary flotation cell 210b. Alternatively, underflow 42a from the first secondary flotation cell 210a may be arranged to be combined with secondary underflow 42b of the further secondary flotation cell 210b (not shown in the figures).

The first secondary flotation cell 210a of the secondary flotation line 20 in fluid communication with a rougher primary flotation cell 111a is 100-2000 m³ in volume. Alternatively, the first secondary flotation cell 210a of the secondary flotation line 20 in fluid communication with a rougher primary flotation cell 111a may be 400-1000 m³ in volume.

The volume of the first secondary flotation cell 210a of the secondary flotation line 20 in fluid communication with at least one rougher primary flotation cell 111a is 2-50% of the aggregate volume of the at least one rougher primary flotation cell 111a. Alternatively, the volume of the first secondary flotation cell 210a of the secondary flotation line 20 in fluid communication with at least one rougher primary flotation cell 111a may be 3-30% of the aggregate volume of the at least one rougher primary flotation cell 111a (see FIG. 4c).

By aggregate volume herein is meant the combined volume of the rougher primary flotation cells 111a from which the first secondary flotation cell 210a receives overflow 51a. For example, the first secondary flotation cell 210a may receive overflows 51a from more than one rougher primary flotation cells 111 of the primary line 10. In that case, the aggregate volume is the combined volume of the rougher primary flotation cells 111.

At least one further secondary flotation cell 210b is arranged downstream of the first secondary cell 210b. The further secondary flotation cell 210b is arranged in direct fluid communication with at least one further rougher primary flotation cell 111b of the primary flotation line 10. The further secondary flotation cell 210b of the secondary flotation line 20 is arranged to receive primary overflow 51b of the at least one further rougher primary flotation cell 111b. The further secondary flotation cell 210b is arranged to receive primary overflow 51b of the at least one further rougher primary flotation cell 111b as inflow, for the recovery of a first concentrate 81, comprising ore particles with valuable mineral or minerals. The further secondary flotation cell 210b, as well as any other secondary flotation cell 210, operates on standard flotation principles, as described earlier in this disclosure. An overflow 50b of the secondary flotation cell 210b is collected as the first concentrate 81, which may then be led to any suitable further processing step known in the art.

The number of secondary flotation cells 210 in series in the secondary flotation line 20 may be same (equal) to the number of rougher primary flotation cells 111 in the primary flotation line 10. In some embodiments, the number of the secondary flotation cells 210 in the secondary flotation line 22 may be lower than the number of rougher primary flotation cells 111 in the primary flotation line 10.

A secondary flotation cell 210a, 210b may be arranged to receive primary overflow 51a, 51b from 1-3 rougher primary flotation cells 111. In an embodiment, a secondary flotation cell 210a, 210b may be arranged to receive primary overflow 51a, 51b from 1-2 rougher primary flotation cells 111a, 111b. In an embodiment, a secondary flotation cell 210a, 210b may be arranged to receive primary overflow 51a, 51b from at most two rougher primary flotation cells 111a, 111b. In an embodiment, a secondary flotation cell 210a may be arranged to receive primary overflow 51a from one single rougher primary flotation cell 111a.

Alternatively or additionally, the further secondary flotation cell 210b may be arranged to receive primary overflow 51b, 51c from at least two rougher primary flotation cells 111b, 111c (see FIG. 12). The further secondary flotation cell 210b may be arranged to receive primary overflow 51b-d from 1-4 rougher primary flotation cells 111b-d. In an embodiment, the further secondary flotation cell 210b may be arranged to receive primary overflow 51b-d from 1-2 rougher primary flotation cells 110b-c. An embodiment where the further secondary flotation cell 210b receives primary overflow 51b from one rougher primary flotation cell 111b is depicted for example in FIGS. 1a-b and 2a-c.

Figure 1A:
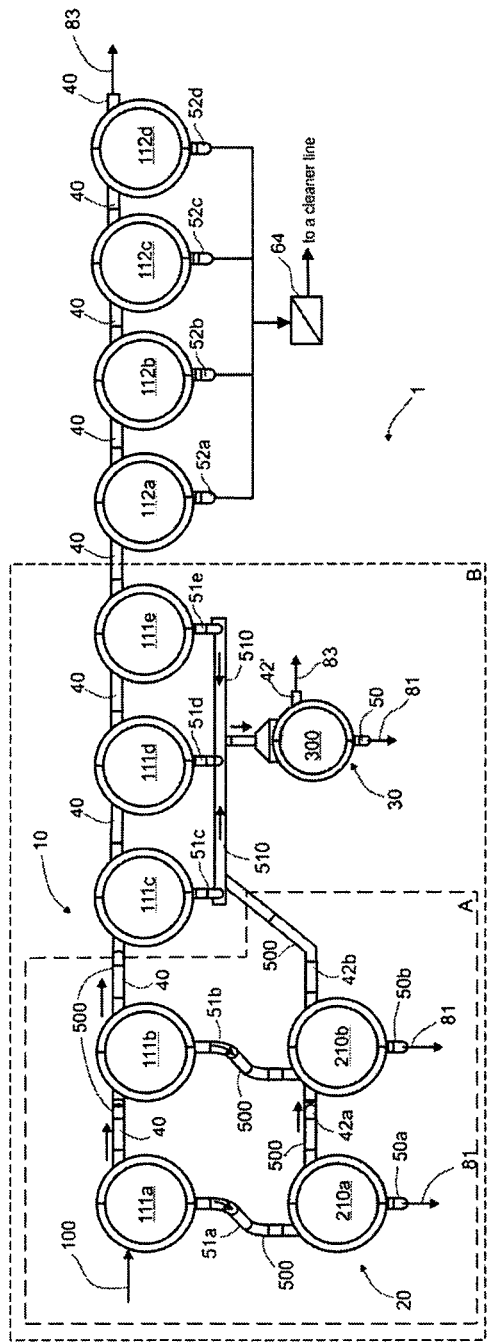
FIG. 1a is a flow chart illustration for an embodiment of the invention.
Figure 1B:
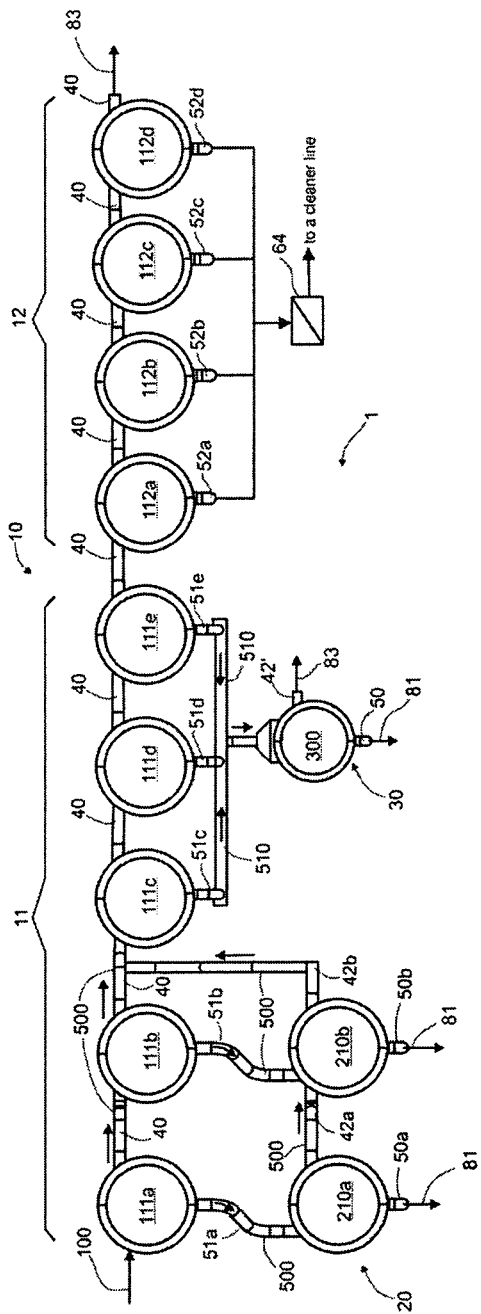
FIG. 1b is a flow chart illustration for an embodiment of the invention.

Underflow 42b from the further secondary flotation cell 210b may be arranged to flow back into the rougher part 11 of the primary flotation line 10 at a point downstream from the rougher primary flotation cell 111b from which the further secondary flotation cell 210b is arranged to receive primary overflow 51b (see FIG. 1a). In an embodiment, underflow 42b from the further secondary flotation cell 210b is arranged to flow back into a further rougher primary flotation cell 110c downstream from the first rougher primary flotation cell 111b from which the further secondary flotation cell 210b is arranged to receive primary overflow 51b (see FIGS. 6a, 9). In an embodiment, underflow 42b from the further secondary flotation cell 210b is arranged to be combined into overflow 51 from at least one further rougher primary flotation cell 111c downstream from the rougher primary flotation cell 111b from which the further secondary flotation cell 210b is arranged to receive primary overflow 51b (see FIG. 1b).

In an embodiment, underflow 42c from a last further secondary flotation cell 210c of the secondary flotation line 20 may be arranged to be combined with the overflow 52a of a scavenger primary flotation cell 112a, or combined overflows 52a-d of two or more scavenger primary flotation cells 112a-d of the scavenger part 12, as shown in FIG. 2 (solid line). This is because the quality in the sense of amount of valuable mineral particles still present in the underflow 42c is close to or similar to that of the overflow(s) 52 of the scavenger line 12, and the two flows may therefore be led to further treatment, for example regrinding 64 together. This may increase the efficiency of the flotation arrangement 1 and also bring about savings in energy consumption, as the number of individual further treatment steps may be reduced.

Alternatively, depending on the mineralogy of underflow 42c, it may also be led into the scavenger part 12 of the flotation arrangement 1 to be treated in scavenger flotation. Underflow 42c may be led into a scavenger primary flotation cell 112a, either directly into the flotation cell, or into a conduit between two primary flotation cells 111, 112. In FIG. 2, an embodiment is shown where underflow 42c is led into the conduit between the last rougher primary flotation cell 111e and the first scavenger primary flotation cell 112a to be combined with underflow 40 of the rougher part 11 (dashed line). It is conceivable that underflow 42c may also be led into a conduit between any two scavenger primary flotation cells 112a-d to be treated in a scavenger primary flotation cell. The above embodiments may be especially beneficial, if the quality of underflow 42c from the secondary flotation line 20 is such that it requires further flotation in order to efficiently recover valuable mineral particles from the flow of slurry.

The further secondary flotation cell 210b of the secondary flotation line 20 in direct fluid communication with a rougher primary flotation cell 111, for example primary flotation cell 111b, is 100-1000 m³ in volume. Alternatively, the further secondary flotation cell 210b of the secondary flotation line 20 in direct fluid communication with a rougher primary flotation cell 111, for example primary flotation cell 111b, may be 300-1000 m³ in volume.

The volume of the further secondary flotation cell 210b of the secondary flotation line 20 in fluid communication with at least one rougher primary flotation cell 111 is 2-50% of the aggregate volume of the at least one primary flotation cell 111. Alternatively, the volume of the further secondary flotation cell 210b of the secondary flotation line 20 in fluid communication with at least one rougher primary flotation cell 111 is 3-30% of the aggregate volume of the at least one primary flotation cell 111 (see FIG. 4c).

By aggregate volume herein is meant the combined volume of the primary flotation cells 111 from which the secondary flotation cell 210b receives overflow 51. For example, the further secondary flotation cell 210b may receive overflows 51b, 51c from primary flotation cells 111b, 111c of the primary line 10 (see FIG. 12). In that case, the aggregate volume is the combined volume of the primary flotation cells 111b, 111c.

In an embodiment, the first secondary flotation cell 210a of the secondary flotation line 20 has a larger volume than the further secondary flotation cell 210b of the secondary line 20.

In an embodiment, the further secondary flotation cell 210b of the secondary flotation line 20 has a larger volume than the first flotation cell 210a of the secondary flotation line 20.

The subsequent further secondary flotation cells 210b, 210c of a secondary flotation line 20 may be arranged in direct cell connection with each other, or they may be arranged in fluid connection with each other via a conduit or conduits 500. In an embodiment, all of the adjoining secondary flotation cells 210 of the secondary flotation line 20 may be arranged in direct cell connection with each other; alternatively, all of the adjoining secondary flotation cells 210 may be arranged in fluid connection via conduits 500; alternatively, some of the adjoining secondary flotation cells 210 may be arranged in direct cell connection, while other may be arranged to have a conduit 500 between them, similarly to what has been described in connection with the primary flotation line 10.

From the area located close to a flotation cell bottom 71, a gangue or a part of the slurry containing ore particles that do not rise onto the surface of the slurry is led out of the first secondary flotation cell 210a as underflow 42a. Underflow 42a is led into a further or subsequent secondary flotation cell 210b that receives underflow 42a as an infeed from the previous secondary flotation cell 210a. The slurry is treated in the further or subsequent secondary flotation cell 210b similarly as in the first secondary flotation cell 210a, in a manner well known to a person skilled in the art.

In an embodiment underflow 42b from the further secondary flotation cell 210b is arranged to flow to the last of the at least one rougher primary flotation cells 111 from which primary overflow 51b was received, or to a rougher primary flotation cell 110c (see FIGS. 6a-c, 9) downstream of the last of the at least one rougher primary flotation cells 51b from which primary overflow 51b was received. Underflow 42b may be directed into a conduit 500 preceding the rougher primary flotation cell 111 into which the underflow 42b is to be led (see FIG. 1b), or into a collecting conduit 510 that collects the overflow from several rougher primary flotation cells 111 (see FIG. 1a), or directly into the rougher primary flotation cell (see for example FIG. 6a).

In an embodiment, the underflow 42' from the last secondary flotation cell of the secondary flotation line 20 may be arranged to flow out of the further secondary flotation cell 210b as a tailings flow 83.

In an embodiment, the underflow 42b may be arranged to flow to a rougher primary flotation cell 111c downstream of the rougher primary flotation cell 111b from which the primary overflow 51b was received. The underflow 42b may be arranged to flow directly into the rougher primary flotation cell 111b, 111c, or into the conduit 500 preceding the rougher primary flotation cell 111b, 111c.

In an embodiment, primary overflow 51a from a primary flotation cell 111a may be arranged to flow into two parallel secondary flotation cells 210a. This embodiment is not shown in the figures. Such embodiment could easily be conceivable for example into the embodiment presented in FIG. 5a by arranging a second first secondary flotation cell 210a next to or in the vicinity of the single secondary flotation tank 210a in the secondary flotation line 20, and directing the overflow 51a via a collecting conduit 510 into the two parallel secondary flotation cells 210a. A first concentration 81 as overflow 50a from both of the two parallel first secondary flotation cells 210a would be separately collected and directed further, while the underflows 42 from both of the two parallel first secondary flotation cells 210a could be collected and directed downstream into the further secondary flotation cell 210b via a collecting conduit 510 similar to that shown in for example FIG. 7.

Flows of slurry, both underflows 40, 42, and overflows 50, 51, 52 may be arranged to be driven by gravity. That is any flow between any at least two flotation cells in fluid connection may be driven by gravity. For example, flow of slurry between the first rougher primary flotation cell 111a and a further rougher primary flotation cell 111b may be driven by gravity. Alternatively of additionally, flow of slurry between a first scavenger primary flotation cell 112a and a further scavenger primary flotation cell 112b may be driven by gravity. Alternatively of additionally, flow of slurry between a rougher primary flotation cell 111e and a scavenger flotation cell 112a may be driven by gravity. Alternatively or additionally, flow of slurry between the first secondary flotation cell 210a and a further secondary flotation cell 210b may be driven by gravity. Alternatively of additionally, flow of slurry between a rougher primary flotation cell and a secondary flotation cell in fluid connection with each other may be driven by gravity. For example, flow of slurry between the first rougher primary flotation cell 111a of the primary flotation line 10 and the first secondary flotation cell 210a of the secondary flotation line 20 may be driven by gravity. For example, flow of slurry between a further rougher primary flotation cell 111b of the primary flotation line 10 and a further secondary flotation cell 210b of the secondary flotation line 20 may be driven by gravity.

Figure 5A:
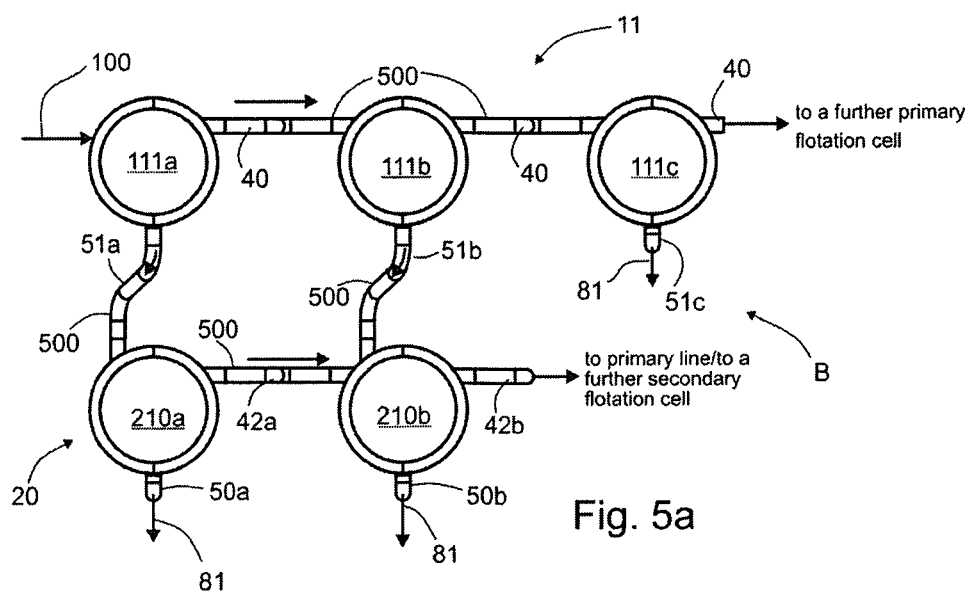
FIG. 5a is a flow chart illustration for another detail of the flotation arrangement.
Figure 5B:
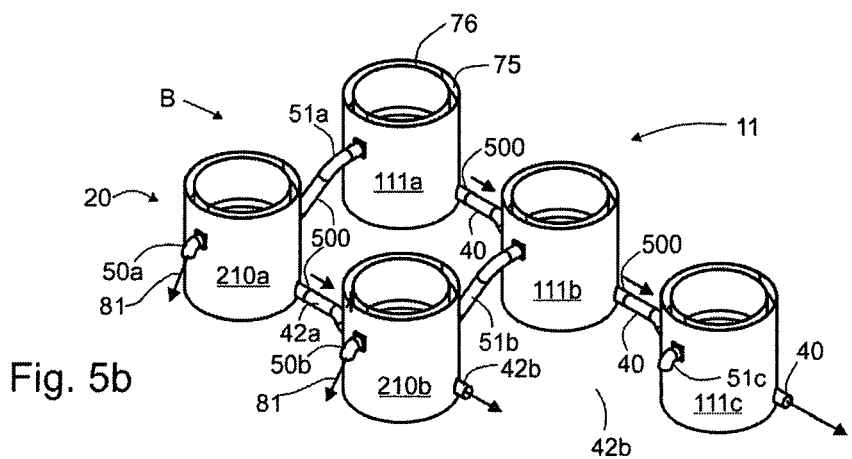
Figure 5C:
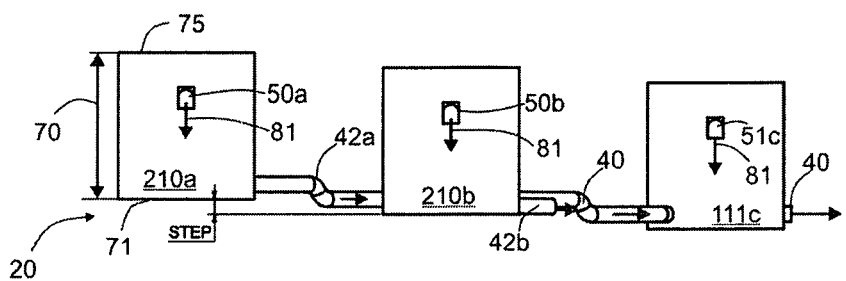
Figure 6A:
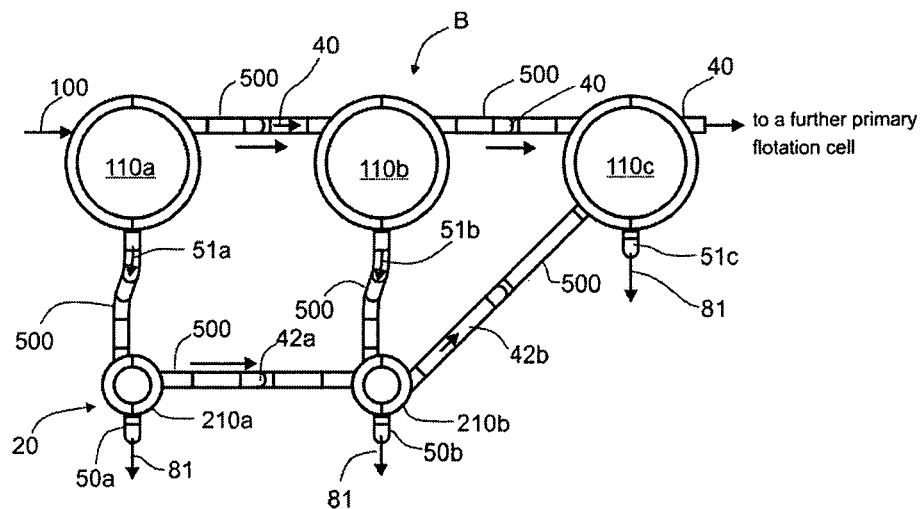
FIG. 6a is a flow chart illustration for a detail of an embodiment of the invention.
Figure 6B:
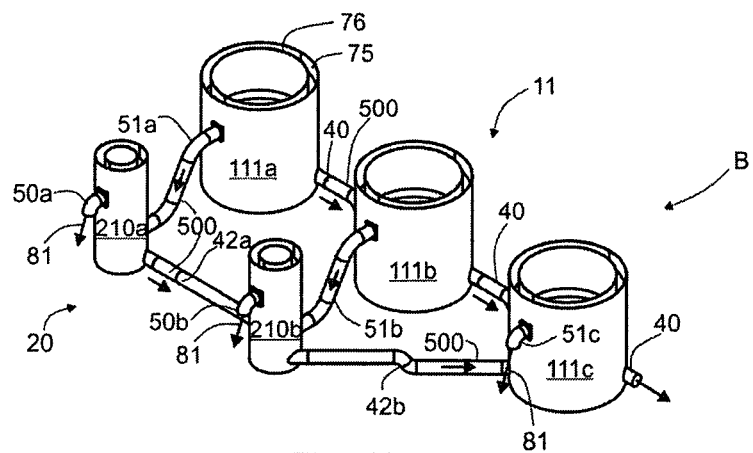
Figure 6C:
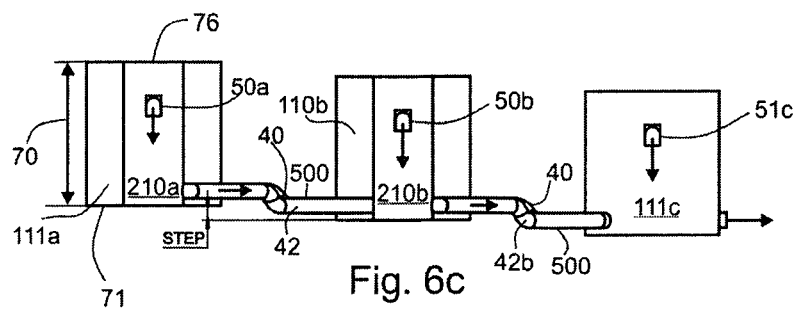

To facilitate the movement by gravity of flows of slurry, at least some of the flotation cells 111, 112 210, 300 may be arranged in a stepwise fashion in relation to the ground level on which the flotation arrangement is established (see FIGS. 5c and 6c). Alternatively, the launder lips 76 of the flotation cells, for example primary flotation cells 111a-c, may be arranged at different heights.

As can be seen in FIGS. 5c and 6c, a step realised in between any adjacent flotation cell causes a difference in the slurry surface level 70 of the two adjacent flotation cells. In this instance, the step is arranged between rougher primary flotation cells 111 of the primary flotation line 10, as well as between the two secondary flotation cells 210a, 210b of the secondary flotation line 20. It is equally conceivable that the step may be arranged between a rougher primary flotation cell 111 of a primary flotation line and at least one secondary flotation cell 210a of the secondary flotation line 20 or a further secondary flotation cell 210b; or between the adjacent secondary flotation cells 210a, 210b of the secondary flotation line 20; or between the last rougher primary flotation cell 111e and the first scavenger primary flotation cell 112a; or between two scavenger primary flotation cells 112 of the scavenger part 12 of the primary flotation line 10.

It is obvious to a person skilled in the art that the vertical positioning of the different flotation cells 111, 112, 210, 300 may be realized in the best possible manner taking into account the requirements of the flotation process and the construction location of the flotation arrangement 1.

The gravitational flow of slurry is achieved by the hydraulic gradient between any two flotation cells with different slurry surface levels, realized with a step between the flotation cell bottoms 71, as can be seen in FIGS. 5c and 6c, or with a step between the launder lip heights, and as has been explained earlier in the summary part of this disclosure.

Alternatively or additionally to the above-described manner of flows of slurry driven by gravity, the flows of slurry may be driven, in the same set-up of flotation cells, by one or more low-head pumps arranged between any two adjoining flotation cells, either into the conduit or conduits 500, or directly between the adjoining flotation cells in case the adjoining cells are arranged in direct cell connection with each other. Pumping may be required when the flotation cells or some of the flotation cells are arranged in an uniplanar fashion, i.e. having the bottoms of the cells 70 at a single level in relation to the ground level, whereby the slurry surface level of two adjoining flotation cells may be more or less the same and now hydraulic gradient is created, at least not sufficiently to drive the flow of slurry by gravity. In an embodiment, the flows of slurry may be driven by gravity between some of the adjoining flotation cells, and by low-head pump or pumps between some of the adjoining flotation cells in the flotation arrangement 1.

The flotation arrangement 1 may also comprise a further processing step 62. For example, the overflow 51c of at least one rougher primary flotation cell 111c may be directed to flow into this further processing step 62. In an embodiment, combined overflows of the at least one rougher primary flotation cell 111c, and that of at least one further rougher primary flotation cell 111d downstream from rougher primary flotation cell 111c may be directed to flow into the further processing step 62. In FIG. 15, a flotation arrangement 1b is shown, where the overflows 51c, 51d of the above-described rougher primary flotation cells 111c, 111d of a primary flotation line 10b are combined and led into the further processing step 62 via a collecting conduit 510. The further processing step 62 in this example is cleaner flotation, performed in a cleaner flotation line.

Alternatively or additionally, the combined secondary overflows 50a, 50b of the at least two secondary flotation cells 210a, 210b may be arranged to flow into a further processing step 62.

Underflow 40' from the last primary flotation cell of the primary flotation line 10, that is, the last scavenger primary flotation cell 112d, may be arranged to flow into a further processing step 62, or it can be arranged to leave the flotation arrangement 1 as tailings 83. Additionally or alternatively, underflow 42' from the last secondary flotation cell 210b of the secondary flotation line 20 may be arranged to flow into a further processing step 62, or it can be arranged to leave the flotation arrangement 1 as tailings 83.

The further processing step 62 may comprise, for example, a grinding step. Alternatively or additionally, the further processing step 62 may comprise a conditioning step. Alternatively or additionally, the further processing step 62 may comprise a flotation step, such as a cleaner flotation step. In other words, the further processing step 62 may comprise several individual process steps in combination, as well.

The flotation arrangement 1 may further comprise an additional secondary flotation line 30 comprising at least one additional secondary flotation cell 300 in fluid communication with at least one rougher primary flotation cell 111 and arranged to receive primary overflow 51 from at least one further rougher primary flotation cell 111 (see for example FIGS. 7 and 8). The additional secondary flotation cell 300 functions essentially in the same manner as the other secondary flotation cells 210, as described earlier in this specification.

The additional secondary flotation cell 300 is arranged to receive primary overflow 51*b* of at least one rougher primary flotation cell 111, and underflow 42 from the further secondary flotation cell 210*b*. Underflow 42' from the additional secondary flotation cell 300 is arranged to leave the flotation arrangement 1 as tailing flow 83. Alternatively or additionally, underflow 42' from the additional secondary flotation cell 300 may be directed into a further processing step 62.

In an embodiment, the first secondary flotation cell 210*a* may be arranged to receive primary overflow 51*a* from the first rougher primary flotation cell 111*a*, and the additional secondary flotation cell 300 is arranged to receive primary overflow 51*b*, 51*c* from at least two further rougher primary flotation cells 111.

In an embodiment, the additional secondary flotation cell 300 may be arranged to receive primary overflow 51*b*, 51*c* of at least two rougher primary flotation cells 110*b*, 110*c* (this embodiment is not shown in the figures). In an embodiment, the additional secondary flotation cell 300 may be a conventional cleaner cell 300, arranged to receive primary overflow 51*c*, 51*d*, 51*e* of at least three rougher primary flotation cells 111*c*, 111*d*, 111*e* (see for example FIG. 9).

In an embodiment, the additional secondary flotation cell 300 may be arranged in a position downstream from the at least one first secondary flotation cell 210*a* and/or the at least one further secondary flotation cell 210*b* (see for example FIGS. 7, 8 and 10).

Figure 13:
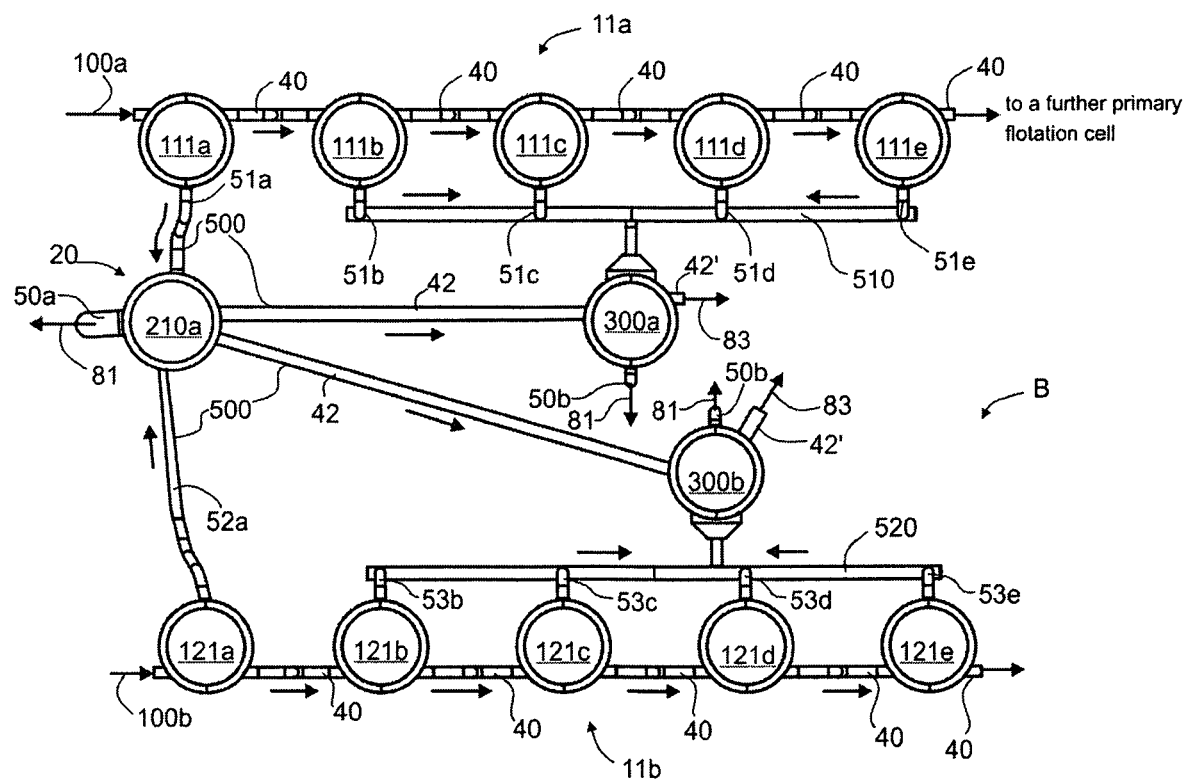
FIG. 13 is a flow chart illustration for a detail of an embodiment of the invention.

According to an embodiment of the invention, the flotation arrangement 1 may comprise two primary flotation lines 10*a*, 10*b*. The first secondary flotation cell 210*a* of the secondary line 20 may receive overflow 51*a*, 52*a* from the first rougher primary flotation cells 111*a*, 121*a* of both primary lines 10*a*, 10*b* (see FIG. 13). In an embodiment, the secondary flotation line 20 may comprise two additional secondary flotation cells 300*a*, 300*b* that are arranged to receive combined overflows from the further rougher primary flotation cells 111*b-e*, and 121*b-e*, respectively, from both primary flotation lines 10*a*, 10*b*. Secondary underflow 42 from the first secondary flotation cell 210*a* may be arranged to flow to both of the additional secondary flotation cells 300*a*, 300*b*, as can be seen in FIG. 13. Underflows 42' may be arranged to flow into a further processing step 62 similarly to what has been described above, either separately, or the two flows may be combined; or arranged to leave the flotation arrangement 1 as tailings 83, separately from both additional secondary flotation cells 300*a*, 300*b*. The tailings flow 83 of the additional secondary flotation cells 300*a*, 300*b* may also be combined and then led to leave the flotation arrangement as a combined tailings flow 83.

At least one of the rougher primary flotation cells 111*a-f*, and/or at least one of the secondary flotation cells 210*a-b*, 300 may comprise a froth flotation cell, or a so-called conventional flotation cell, the operation of which has been described in the Summary section of this disclosure. In an embodiment, a third rougher primary flotation cell 111*c* of the primary flotation line 10 comprises a froth flotation cell. In addition, any subsequent rougher primary flotation cell 111*d-f* after the third rougher primary flotation cell 111*c* may comprise a froth flotation cell. In an embodiment, the first rougher primary flotation cell 111*a* and a second rougher primary flotation cell 111*b* of the primary flotation line 10 may be operated as overflow flotation cells, the details of which have been also described in the Summary section of this disclosure.

Additionally or alternatively to the two embodiments above, the secondary flotation line 20 may comprise at least one cleaner cell, that is, one or more of the secondary flotation cells 210*a-b*, 300 may act as rougher cleaner cells, and thus the secondary flotation line 20 may be understood to be, or to operate as, a rougher cleaner line or circuit.

In an embodiment, flotation gas may be fed into the flotation cell where the slurry is separated into overflow and underflow. The flotation cell into which flotation gas is fed may comprise a mixer. Alternatively, the flotation gas may be fed into a preparation flotation cell 115 into which a mixer is arranged.

The flotation arrangement 1 described herein is particularly suitable for, but not limited to, use in recovering valuable mineral containing ores, where the mineral ore particles comprise copper (Cu), zinc (Zn), iron (Fe), pyrite, or a metal sulfide such as gold sulfide. Mineral ore particles comprising other valuable mineral such as Pb, Pt, PGMs (platinum group metals Ru, Rh, Pd, Os, Ir, Pt), oxide mineral, industrial minerals such as Li (i.e. spodumene), petalite, and rare earth minerals may also be recovered according to the different aspects of this invention. The flotation arrangement is suitable for use in recovering mineral ore particles comprising a valuable mineral, particularly from low grade ore. The flotation arrangement is particularly suitable for recovering mineral ore particles comprising Cu from low grade ore. The flotation arrangement is also suitable for recovering mineral ore particles comprising Fe by reverse flotation.

An embodiment of the use of a flotation arrangement according to this disclosure may utilise, in the flotation arrangement, a first rougher primary flotation cell 111*a* which is at least 150 m$^3$ in volume, and gravity to drive the flow of slurry. An embodiment of the use of a flotation arrangement according to this disclosure may utilise, in the flotation arrangement, a first rougher primary flotation cell 111*a* which is at least 500 m$^3$ in volume, and gravity to drive the flow of slurry. An embodiment of the use of a flotation arrangement according to this disclosure may utilise, in the flotation arrangement, a first rougher primary flotation cell 111*a* which is at least 2000 m$^3$ in volume, and gravity to drive the flow of slurry.

An embodiment of the use of a flotation arrangement according to this disclosure may utilise, alternatively or additionally, a second rougher primary flotation cell 111*b* which is at least 100 m$^3$ in volume, and gravity to drive the flow of slurry. An embodiment of the use of a flotation arrangement according to this disclosure may utilise a second rougher primary flotation cell 111*b* which is at least 300 m$^3$ in volume, and gravity to drive the flow of slurry. An embodiment of the use of a flotation arrangement according to this disclosure may utilise a second rougher primary flotation cell 111*b* which is at least 500 m$^3$ in volume, and gravity to drive the flow of slurry.

An embodiment of the use of a flotation arrangement according to this disclosure may utilise, alternatively or additionally, gravity to drive the flow of slurry between the rougher primary flotation cells 111*a-f*.

An embodiment of the use of a flotation arrangement according to this disclosure may utilise, alternatively or additionally, gravity to drive the flow of slurry between the secondary flotation cells 210*a-b*, 300.

An embodiment of the use of a flotation arrangement according to this disclosure may utilise, alternatively or additionally, gravity to drive the flow of slurry between a rougher primary flotation cell 111 and a secondary flotation cell 210, the two flotation cells having a fluid connection with each other. An embodiment of the use of a flotation arrangement according to this disclosure may utilise gravity to drive the flow of slurry between the first rougher primary flotation cell 111a and the first secondary flotation cell 210a. Alternatively or additionally, a further embodiment of the use of a flotation arrangement according to this disclosure may utilise gravity to drive the flow of slurry between a further rougher primary flotation cell 110b-f and a further secondary flotation cell 210b or an additional secondary flotation cell 300.

According to a further aspect of the invention, a flotation plant 9 comprises a flotation arrangement 1 according to this specification. In an embodiment, the flotation plant 9 may comprise at least two flotation arrangements 1. In an embodiment, the flotation plant 9 may comprise at least three flotation arrangements 1. In an embodiment, the flotation plant 9 may comprise at least one first flotation arrangement 1a for the recovery of a first concentrate 81, and at least one second flotation arrangement 1b for the recovery of a second concentrate 82 (see FIG. 15).

In an embodiment, the primary flotation cells 111, 112 of the primary flotation line 10a of the at least one first flotation arrangement 1a for the recovery of the first concentrate 81 and the primary flotation cells 111, 122 of the primary flotation line 10b of the at least one second flotation arrangement 1b for the recovery of the second concentrate 82 are arranged in series (see FIG. 15).

The flotation plant 9 may comprise a flotation arrangement 1 arranged to recover Cu. Alternatively or additionally, the flotation plant 9 may comprise a flotation arrangement 1 arranged to recover Zn. Alternatively or additionally, the flotation plant 9 may comprise a flotation arrangement 1 arranged to recover pyrite. Alternatively or additionally, the flotation plant 9 may comprise a flotation arrangement 1 arranged to recover a metal from a sulfide, such as gold. According to a further embodiment of the invention, the flotation plant 9 may comprise a flotation arrangement 1 arranged to recover mineral ore particles comprising Cu from low grade ore. According to an embodiment of the invention, the flotation plant 9 may comprise a flotation arrangement 1 arranged to recover Fe by reverse flotation.

The flotation plant 9 may further comprise an arrangement for further treating the mineral ore particles suspended in slurry so that the second concentrate 82 is different from the first concentrate 81. In an embodiment, the arrangement for further treating the mineral ore particles may be a grinding step 62 disposed between a first flotation arrangement 1a and a second flotation arrangement 1b. In an embodiment, the arrangement for further treating the mineral ore particles may be an arrangement 65 for the addition of flotation chemicals, disposed between a first flotation arrangement 1a and a second flotation arrangement 1b.

According to another aspect of the invention, a flotation method for treating mineral ore particles suspended in slurry is presented. In the method, slurry is subjected to primary flotation 10 comprising at least two rougher flotation stages 111a, 111b in series and in fluid communication for separating the slurry into primary underflow 40 and primary overflow 51a, 51b, and further comprising at least two scavenger flotation stages 112a, 112b in series and in fluid communication for separating the slurry into underflow 40 and primary overflow 52a, 52b.

Primary underflow 40 from a previous primary flotation stage 111a may be directed to a subsequent primary flotation stage 111b. Primary overflow 51a from at least a first primary flotation stage 110a is directed to a first secondary flotation stage 210a of secondary flotation 20 for the recovery of a first concentrate 81, secondary flotation 20 comprising at least two secondary flotation stages 210a, 201b in series and in fluid communication. The at least first rougher flotation stage 110a and the first secondary flotation stage 210a are arranged in series and in fluid communication. Further according to the method, in the secondary flotation 20 primary overflow 51b from at least one further rougher flotation stage 111b is directed to a further secondary flotation stage 210b arranged in series and in fluid communication with the at least one further rougher flotation stage 111b, for the recovery of a first concentrate 81, and underflow 42a from the previous secondary flotation stage 210a is directed to the further secondary flotation stage 210b. Alternatively, underflow 42a from a previous secondary flotation stage 210a may be combined with underflow 42b from the further secondary flotation stage 210b. Primary overflow 52a, 52b from the scavenger flotation stages 112a, 112b is directed back to a rougher flotation stage 111a, 111b, or into regrinding 64 and then to cleaner flotation.

The slurry may be subjected to at least four primary flotation stages. In an embodiment, the slurry may be subjected to 4-10 primary flotation stages. In an embodiment, the slurry may be subjected to 4-7 primary flotation stages. Alternatively or additionally, the slurry may be subjected to at least two secondary flotation stages. In an embodiment, the slurry may be subjected to 2-10 secondary flotation stages. In an embodiment, the slurry may be subjected to 4-7 secondary flotation stages.

In an embodiment, primary overflow 51c-e from 1-3 rougher flotation stages 111c-e may be directed to a secondary flotation stage 210b. In an embodiment, primary overflow 51b-c from 1-2 rougher flotation stages 111b-c may directed to a secondary flotation stage 210b. In an embodiment, primary overflow 51c from at least one further rougher flotation stage 111c, and secondary underflow 42 from the further secondary flotation stage 210b may be directed to an additional secondary flotation stage 300 of secondary flotation. In an embodiment, primary overflow 51a from a first rougher flotation stage 111a may be directed to a first secondary flotation stage 210a, and primary overflow 51b-c from at least two further rougher flotation stages 110b-c may be directed to the additional secondary flotation stage 300.

In an embodiment, a secondary flotation stage 210a may receive primary overflow 51a, 51b from at most two rougher flotation stages 111a, 111b. In a further embodiment, a secondary flotation stage 210a may receive primary overflow 51a from only one rougher flotation stage 111a. In and embodiment, additionally or alternatively, a further secondary stage 210b may receive primary overflow 51b, 51c from at most two rougher flotation stages 110b, 110c.

In an embodiment, underflow 42b from a secondary flotation stage 210b may be directed to primary flotation 10 in the last of the at least one rougher flotation stage 111b from which the primary overflow 51b was received, or in a rougher flotation stage 111c-e downstream of the last of the at least one rougher flotation stage 111b from which the primary overflow 51b was received.

Froth flotation may be employed in at least one rougher flotation stage 111a and/or at least one secondary flotation stage 210a. Additionally or alternatively, overflow flotation may be employed in the first rougher flotation stage 111a. In an embodiment, overflow flotation may be employed in the first rougher flotation stage 111a and in a second rougher flotation stage 111b.

EXAMPLES

The flows of slurry (overflow, underflow) between the different flotation cells (primary flotation cells and/or secondary flotation cells) may be arranged in any suitable fashion depending on the flotation process requirements and physical characteristics of the site into which the flotation arrangement is established. In the following, examples of possible embodiments are given.

Examples 1-10 describe in more detail the flows of slurry in and between the rougher part 11 of the primary flotation line 10 and the secondary flotation line 20, i.e. the part of the flotation arrangement 1 annotated "B" in FIG. 1a. Example 11 describes a flotation plant 9 according to the invention.

It is obvious to a person skilled in the art that other combinations are possible within scope of the invention. Different embodiments may be combined in order to obtain suitable arrangements. In the following, embodiments of the invention are presented in relation to the figures as stated.

Example 1

In an embodiment of the invention as presented in FIGS. 5a-c, a slurry inflow 100 is lead into a flotation arrangement 1 comprising a primary flotation line 10 with a first rougher primary flotation cell 111a to be separated into an underflow 40 and an overflow 51a. For the sake of clarity, in FIGS. 5a-c, only part B of the entire flotation arrangement 1 is shown.

Underflow 40, which may comprise an amount of mineral ore particles comprising valuable mineral, from the first rougher primary flotation cell 111a is directed into an adjoining second rougher primary flotation cell 111b, connected in series with the first rougher primary flotation cell 111a, via a conduit 500, to be further separated into an underflow 40 and an overflow 51b.

Underflow 40, which may still comprise an amount of mineral ore particles comprising valuable mineral, from the second rougher primary flotation cell 111b is directed into an adjoining third rougher primary flotation cell 111c, connected in series with the second rougher primary flotation cell 111b, via a conduit 500, to be further separated into an underflow 40 and an overflow 51c.

It is to be understood that after the last rougher primary flotation cell 111c shown in the figures, underflow 40 is directed to a further primary flotation cell, which may either be a further rougher primary flotation cell 111, or a scavenger primary flotation cell 112; and that after the last secondary flotation cell 210b shown in the figures, underflow 42b is directed to the primary flotation line 10, to a further secondary flotation cell 210, or to an additional secondary flotation cell 300 according to the invention as described earlier. This applies to all of the examples presented here.

Overflow 51c is collected as a first concentrate 81 to be further treated in any suitable manner known in the art. The arrangement thus far is a typical arrangement for conventional froth flotation.

Overflow 51a from the first rougher primary flotation cell 111a is directed into a secondary flotation line 20, which comprises a secondary flotation cell 210a, via a conduit 500 to be separated into an overflow 50a and an underflow 42a in the secondary flotation cell 210a. The overflow 50a is directed out of the secondary flotation line 20 as a first concentrate 81, to be further treated in any suitable manner. This part of the flotation circuit is similar to any conventional froth flotation arrangement.

However, contrary to a conventional cascading flotation process, the underflow 42a, which may comprise an amount of mineral ore particles comprising valuable mineral, from the first secondary flotation cell 210a is directed into a further secondary flotation cell 210b for further treatment in order to recover any remaining mineral ore particles comprising valuable mineral, thus increasing the recovery rate for that mineral within the flotation arrangement 1. This is very advantageous in recovering ore particles comprising valuable mineral from slurries comprising low-grade ores.

Similarly, overflow 51b from the second rougher primary flotation cell 111b is directed into the secondary flotation line 20, more specifically to a further secondary flotation cell 210b via a conduit 500, to be separated into an overflow 50b and an underflow 42b in the secondary flotation cell 210b. The overflow 50b is directed out of the secondary flotation line 20 as a first concentrate 81, to be further treated in any suitable manner. The concentrates 81 from the secondary flotation line 20 may be combined prior to the further treatment.

Underflow 42b from the further secondary flotation cell 210b may be directed further in the manner described above.

The rougher primary flotation cells 111a, 111b and 111c are arranged in a stepwise manner so that there is a difference in slurry surface level 70 between each subsequent rougher primary flotation cell 111a, 111b, 111c. In this particular example, as shown in FIG. 5c, each subsequent rougher primary flotation cell 111b, 111c has a bottom 71 arranged on a lower level than the preceding rougher primary flotation cell 111a, 111b creating a step between the flotation cells. The difference in slurry surface level 70 may, naturally, be realized by arranging the launder lips 76 of each subsequent rougher primary flotation cell 111a, 111b, 111c at a different height.

At the same time, a similar step may be arranged between the secondary flotation cells 210a, 210b, as well as between the first rougher primary cell 111a and the secondary flotation cell 210a, and the second rougher primary flotation cell 111b and the secondary flotation cell 210b.

Due to the steps, the slurry surface levels 70 of each subsequent downstream flotation cell is lower than the slurry surface level 70 of the previous flotation cell, in the direction of the flow of slurry, which creates a suitable head between the cells to allow the flows of slurry to be driven by gravity. This may lead to savings in energy consumption as no pumping energy is needed. Also the construction of the flotation arrangement may be simplified.

Example 2

In FIGS. 6a-c is presented a detail part B of another embodiment of the flotation arrangement 1. In the otherwise similar embodiment to the one in Example 1, the secondary flotation cells 210a, 210b are smaller in volume than the rougher primary flotation cells 111a, 111b, 111c, and underflow 42b from the further secondary flotation cell 210b is arranged to flow into the third rougher primary flotation cell 111c, to be treated again in the rougher part 11 of the primary flotation line 10.

By using secondary flotation cells smaller in volume than the rougher primary flotation cells from which the secondary flotation cells receive overflow 51, the secondary flotation line 20 may be more efficient in recovering particles which have less valuable mineral in them, i.e. are harder to be led to the surface and froth layer to be recovered into the overflow, thus leading to higher grade concentration 81. This would further increase the recovery rate of the flotation arrangement 1.

Contrary to a conventional cascading flotation process, the underflow 42b, which may still comprise an amount of mineral ore particles comprising valuable mineral, from the further secondary flotation cell 210b is directed into the third rougher primary flotation cell 111c for further treatment in order to recover any remaining mineral ore particles comprising valuable mineral, thus increasing the recovery rate for that mineral within the flotation arrangement 1. This so-called short connection flotation is very advantageous in recovering ore particles comprising valuable mineral from slurries comprising low-grade ores.

Example 3

In one embodiment of the flotation arrangement 1 as depicted in detail B in FIG. 7, a slurry inflow 100 is lead into the rougher part 11 of a primary flotation line of a flotation arrangement, comprising a first rougher primary flotation cell 111a, to be separated into an underflow 40 and an overflow 51a.

Underflow 40, which may comprise an amount of mineral ore particles comprising valuable mineral, from the first rougher primary flotation cell 111a is directed into an adjoining second rougher primary flotation cell 111b, connected in series with the first rougher primary flotation cell 111a, via a conduit 500, to be further separated into an underflow 40 and an overflow 51b.

Underflow 40, which may still comprise an amount of mineral ore particles comprising valuable mineral, from the second rougher primary flotation cell 111b is directed into an adjoining third rougher primary flotation cell 111c, connected in series with the second rougher primary flotation cell 111b, via a conduit 500, to be further separated into an underflow 40 and an overflow 51c.

Underflow 40, which may still comprise an amount of mineral ore particles comprising valuable mineral, from the third rougher primary flotation cell 111c is directed into an adjoining fourth rougher primary flotation cell 111d, connected in series with the third rougher primary flotation cell 111c, via a conduit 500, to be further separated into an underflow 40 and an overflow 51d.

Underflow 40, which may still comprise an amount of mineral ore particles comprising valuable mineral, from the fourth rougher primary flotation cell 111d is directed into an adjoining fifth rougher primary flotation cell 111e, connected in series with the fourth rougher primary flotation cell 111d, via a conduit 500, to be further separated into an underflow 40 and an overflow 51e.

Underflow 40 from the fifth rougher primary flotation cell 111e is led to a further primary flotation cell in the primary flotation line 10, which may be a yet further rougher flotation cell 111 of a scavenger primary flotation cell 112 in a scavenger part 12 of the primary line 10.

Overflow 51a from the first rougher primary flotation cell 111a is directed into a secondary flotation line 20 with a first secondary flotation cell 210a via a conduit 500 to be separated into an overflow 50a and an underflow 42a in the first secondary flotation cell 210a. The secondary flotation cell 210a may be smaller in volume than the first rougher primary flotation cell 111a. The overflow 50a is directed out of the secondary flotation line 20 as a first concentrate 81, to be further treated in any suitable manner.

The underflow 42a, which may comprise an amount of mineral ore particles comprising valuable mineral, from the first secondary flotation cell 210a is directed into an additional secondary flotation cell 300 for further treatment in order to recover any remaining mineral ore particles comprising valuable mineral, thus increasing the recovery rate of the flotation arrangement 1 for that mineral within the flotation arrangement 1. The underflow 42a may be led forward by gravity only, or as seen in FIG. 7, by a low-head pump 60, both of which may decrease the energy consumption of the flotation process.

Overflows 51b, 51c, 51d, 51e from the further rougher primary flotation cells 111b, 111c, 111d, 111e are first collected into a collecting conduit 510 and directed together as one inflow into the additional secondary flotation cell 300 to be separated into an overflow 50 and an underflow 42'.

Underflow 42' is arranged to flow out of the secondary flotation line 20 as tailings 83. Overflow 50 is directed out of the additional secondary flotation cell 300 as a first concentrate 81, to be further treated in any suitable manner. The concentrates 81 from the secondary flotation line 20 may be combined for further treatment.

The volume of the additional secondary flotation cell is chosen to accommodate the aggregate volume of overflows 51b, 51c, 51d, 51e from the rougher part 11 of the primary flotation line 10, as well as the underflow 42a from the first secondary flotation cell 210a. It may, however, be smaller in volume than the aggregate volume of the rougher primary flotation cells 111b, 111c, 111d, 111e.

The rougher primary flotation cells 111a, 111b, 111c, 111d and 111e are arranged in a stepwise manner, as described earlier. Similarly, the secondary flotation cell 210a is a step above the rougher primary flotation cell 111b to which the underflow 42a is directed. There is also a step between the additional secondary flotation cell 300 and at least some of the rougher primary flotation cells 111b, 111c, 111d. Therefore gravity may be used to drive the flows of slurry between these flotation cells.

In case arranging the different flotation cells in a stepwise manner is not possible, or is only partially possible, one or more low-head pumps 60 may be used to drive the flow of slurry between any two flotation cells having fluid connection with each other but having not enough of a difference in their respective slurry surface levels to allow for gravitational driving of flow of slurry only.

Example 4

In FIG. 8, a slightly different embodiment to the one presented above is shown. The underflow 42a from the first secondary flotation cell 210a is directed into a further secondary flotation cell 210b, which also receives primary overflow 51b from the second rougher primary flotation cell 111b. From the further secondary flotation cell 210b, underflow 42b is directed to the additional secondary flotation cell 300, which receives overflow 51 from the rougher part 11 of the primary flotation line 10, although only from three rougher primary flotation cells 111c, 111d, 111e. Otherwise the process is operated similarly to Example 3.

Example 5

An embodiment as depicted in FIG. 9 combines the advantageous configurations of FIGS. 6a and 5: the rougher part 11 of a primary flotation line 10 comprises five rougher primary flotation cells 110a-e connected in series, and the underflows 40 are treated similarly to what has been presented above in connection with Example 3 and 4. The secondary flotation line 20 is similar to that of Example 4, having a first secondary flotation cell 210a receiving overflow 51a from the first rougher primary flotation cell 111a, and a further secondary flotation cell 210b receiving primary overflow 51b from a further rougher primary flotation cell 111b and secondary underflow 42a from the first secondary flotation cell 210a.

However, contrary to the embodiment in Example 4, underflow 42*b* from the further secondary flotation cell 210*b* is arranged to flow back into the rougher part 10, more specifically, into a third rougher primary flotation cell 111*c*. It is equally conceivable that underflow 42*b* may be led to a conduit 500 between the second rougher primary flotation cell 111*b* and the third rougher primary flotation cell 111*c* to be combined with underflow 40 of the second rougher primary flotation cell 111*b* (see FIG. 1*b*). Overflows 50*a*, 50*b* are collected as a first concentrate 81, as described before.

By directing underflow 42*b*, which may still comprise an amount of mineral ore particles comprising valuable mineral, from the further secondary flotation cell 210*b* back into the rougher part 11 of the primary line 10, more specifically, into the third rougher primary flotation cell 111*c* for further treatment, any remaining mineral ore particles comprising valuable mineral may efficiently be recovered, thus increasing the recovery rate for that mineral within the flotation arrangement 1.

In addition, an additional secondary flotation cell 300 is arranged to receive overflows 51*c*, 51*d*, 51*e* from the third, fourth and fifth rougher primary flotation cells 111*c*, 111*d*, 111*e*. These primary overflows 51*c-e* are first collected into a collecting conduit 510 and directed together as one inflow into the additional secondary flotation cell 300 to be separated into an overflow 50 and an underflow 42'.

The volume of the first and further secondary flotation cells 210*a*, 210*b* may be smaller than volume of the rougher primary flotation cells 111*a*, 111*b*, as has been described above. The volume of the additional secondary flotation cell 300 is chosen to accommodate the aggregate volume of overflows 51*c*, 51*d*, 51*e*. It may, however, be smaller in volume than the aggregate volume of the rougher primary flotation cells 111*c*, 111*d*, 111*e*.

The flow of slurry may be driven by one or more low-head pumps, whereas the other flows may be driven by gravity if suitable steps are arranged between the adjoining flotation cells in fluid connection with each other (not shown in FIG. 9).

The overflow 50 is directed out of the additional secondary flotation cell 300 as a first concentrate 81, to be further treated in any suitable manner. The concentrates 81 from the secondary flotation line 20, and the additional secondary flotation cell 300, may be combined for further treatment.

Example 6

In FIG. 10, detail B of yet another embodiment is presented. In this variation, the secondary flotation line 20 comprises three secondary flotation cells 210*a*, 210*b*, 210*c* arranged in series.

In this embodiment, primary overflow 51*a* from the first rougher primary flotation cell 111*a* is directed into the first secondary flotation cell 210*a*, and primary overflow 51*b* from the second rougher primary flotation cell 111*b* is directed into a first further secondary cell 210*b*. Secondary underflow 42*a* from the first secondary flotation cell 210*a* is directed into the first further secondary flotation cell 210*b*. Secondary underflow 42*b* from that flotation cell is further directed into a second further secondary flotation cell 210*c* in fluid communication with the previous secondary flotation cell 210*b*. From there, secondary underflow 42*c* is still directed further into the additional secondary flotation cell 300. Secondary overflows 50*a*, 50*b*, 50*c* and 50 from the respective secondary flotation cells 210*a*, 210*b*, 210*c* and 300 are recovered as first concentrates 81. Final secondary underflow 42' is led out of the additional secondary flotation cell 300 as tailings 83.

Primary overflows 51*c*, 51*d*, 51*e* from the third, fourth and fifth rougher primary flotation cells 111*c*, 111*d*, 111*e* are first collected into a collecting conduit 510 and directed together as one inflow into the additional secondary flotation cell 300 to be separated into an overflow 50 and an underflow 42', as in Example 5 and 6.

Example 7

In one embodiment of the invention, detail B of which is presented in FIG. 11, the rougher part 11 of a primary flotation line 10 comprises also five rougher primary flotation cells 111*a*, 111*b*, 111*c*, 111*d*, 111*e*. The two first rougher primary flotation cells 111*a*, 111*b* have a larger volume than the last three rougher primary flotation cells 111*c*, 111*d*, 111*e*. The flotation process in the rougher part 11 of the primary flotation line 10 is, however, similar to what has been described in connection with the previous examples.

The secondary flotation line 20 comprises three secondary flotation cells 210*a*, 201*b*, 300 operating similarly to what has been described above. The volume of the secondary flotation cells 210*a*, 210*b* is smaller than the volume of the two first rougher primary flotation cells 111*a*, 111*b*.

The additional secondary flotation cell 300 is arranged to receive the combined overflows 51*c*, 51*d*, 51*e* from the three last rougher primary flotation cells 111*c*, 111*d*, 111*e* via a collecting conduit 510. As the aggregate volume of the three last primary flotation cells 111*b*, 111*c*, 111*d* is smaller in this embodiment, also the volume of the additional secondary flotation cell 300 may be smaller, as can be seen in FIG. 11.

Secondary underflow 42' from the additional secondary flotation cell 300 is led out of the flotation arrangement 1 as tailings flow 83, which may be combined with the tailings flow 83 of the primary flotation line 10. The combined tailings flow may, for example, be led into another flotation arrangement 1 for the recovery of a second concentrate 82.

Secondary overflow 50, 50*a*, 50*b* comprise a recovered first concentrate 81, to be further processed similarly to what has been described in connection with the other examples and embodiments.

Example 8

In FIG. 12, detail B of yet another embodiment of the flotation arrangement 1 is presented. In this embodiment, the rougher part 11 of a primary line 10 comprises six rougher primary flotation cells 111*a*, 111*b*, 111*c*, 111*d*, 111*e*, 111*f*. The flotation process in the rougher part 11 is similar to what has been described in connection with the previous examples.

Overflow 51*a* from the first rougher primary flotation cell 111*a* is directed into a first secondary flotation cell 210*a* via a conduit 500 to be separated into an overflow 50*a* and an underflow 42*a* in the secondary flotation cell 210*a*. The secondary flotation cell 210*a* may be smaller in volume than the first rougher primary flotation cell 111*a*. The overflow 50*a* is directed out of the first secondary flotation cell 20 as a first concentrate 81, to be further treated in any suitable manner.

Secondary underflow 42*a* from the first secondary flotation cell 210*a*, which underflow 42*a* may comprise an amount of mineral ore particles comprising valuable mineral, is directed into a further secondary flotation cell 210*b* for further treatment in order to recover any remaining mineral ore particles comprising valuable mineral, thus increasing the recovery rate for that mineral within the flotation arrangement 1.

Primary overflows 51b, 51c from the second and third rougher primary flotation cells 111b, 111c are first collected into a collecting conduit 510 and directed together as one inflow into the further secondary flotation cell 210b to be separated into a secondary overflow 50b and a secondary underflow 42b. The volume of the secondary flotation cell 210b may be smaller than the aggregate volume of the two rougher primary flotation cells 111b, 111c from which it received the overflows 51b, 51c.

Secondary overflow 50b of the secondary flotation cell 210b is collected as a first concentrate 81, and secondary underflow 42b is arranged to flow into an additional secondary flotation cell 300 for further treatment.

The additional secondary flotation cell 300 is arranged to receive the combined overflows 51d, 51e, 51f from the three last rougher primary flotation cells 111d, 111e, 111f via a collecting conduit 510.

The underflow 42' from the additional secondary flotation cell 300 is led out of the flotation arrangement 1 as a tailings flow 83, which may be combined with the tailings flow 83 of the primary flotation line 10 (not shown in FIG. 12). The combined tailings flows 83 may, for example, be led into another flotation arrangement 1 for the recovery of a second concentrate 82.

Overflow 50 of the additional secondary flotation cell 300 comprises a recovered first concentrate 81, to be further processed similarly to what has been described in connection with the other examples and embodiments.

Example 9

In FIG. 13, detail B of a further embodiment of the flotation arrangement 1 is presented. In the embodiment, there are two primary flotation lines, both comprising a rougher part 11a and 11b. Both rougher parts 11a, 11b comprise five rougher primary flotation cells 111a-e, 121a-e, respectively. The primary flotation lines are arranged to treat the flow of slurry similarly as described in connection with, for example, Examples 3 and 4.

However, the primary overflows 51a, 53a from the first rougher primary flotation cells 111a, 121a of both of the rougher parts 11a, 11b are arranged to flow into a single secondary flotation cell 210a. Secondary overflow 50a from the secondary flotation cell 210a is recovered as a first concentrate 81.

Secondary underflow 42 is directed downstream in two separate flows (i.e. the secondary underflow 42 from the first secondary flotation cell 210a is divided into two separate flows within the first secondary flotation cell 210a, or the underflow 42 may be separated into two flows further downstream from the first secondary flotation cell 210a) into two additional secondary flotation cells: a first additional secondary flotation cell 300a, arranged to receive the combined overflows 51b, 51c, 51d, 51e from the four last rougher primary flotation cells 111b, 111c, 111d, 111e of the rougher part 10a of the first primary flotation line via a collecting conduit 510; and a second additional secondary flotation cell 300b, arranged to receive the combined overflows 53b, 53c, 53d, 53e from the four last rougher primary flotation cells 121b, 121c, 121d, 121e of the rougher part 10b of the second primary flotation line via a collecting conduit 520.

Similarly to what has been described in connection with Example 8, the underflows 42' from the additional secondary flotation cells 300a, 300b are led out of the flotation arrangement 1 as tailings flows 83, which may be combined with the tailings flow 83 of the primary flotation lines (not shown in the figure). Overflows 50b of the additional secondary flotation cells 300a, 300b comprises a recovered first concentrate 81, to be further processed similarly to what has been described in connection with the other examples and embodiments.

Example 10

In FIG. 14, detail B of a further embodiment of the flotation arrangement 1 is presented. In essence, it comprises the same constructional details as the arrangement of Example 8 (see FIG. 12), but instead of single flotation cells 111, 210, where the slurry is both aerated and separated into two fractions (overflow and underflow) in a single cell, each flotation line 10, 20 comprises a first preparatory flotation cell 115, 215 and a flotation cell 111, 210 adjoining the preparation flotation cell 115, 215 via a hydraulic conduit 41. In the preparation flotation cell 115, 215 flow of slurry is aerated either by an agitator equipped with gas input or a sparger-type aeration device. The adjoining flotation cell 111, 210 operates as a flotation cell without mechanical agitation to ensure the stability of the gas bubble-ore particle agglomerates and the formation of an undisturbed froth layer. Also the scavenger part of the primary flotation line may comprise similar preparatory flotation cell-flotation cell combination although this is not shown in FIG. 14.

Slurry inflow 100 is first led into the rougher part 11 a primary flotation line of the flotation arrangement. More specifically, slurry is led into a preparation flotation cell 115a to be treated as disclosed above. From the preparation flotation cell 115a, the flow of slurry is directed via a hydraulic conduit 41 to a rougher primary flotation cell 111a, from which the overflow 51a is directed to a first secondary flotation line 20 comprising a similar preparation flotation cell 215a and a via a hydraulic conduit 41 adjoining flotation cell 210a.

Primary underflow 40 from a rougher primary flotation cell 111a of the primary flotation line 10 is led further downstream to be treated similarly in the further preparation flotation cells 115 and rougher primary flotation cells 111 of the rougher part 11 until primary underflow 40 of the last flotation cell 111f is led to a scavenger part similarly to the other embodiments of this invention.

Secondary underflow 42a from the flotation cell 210a of the secondary flotation line 20 is directed downstream to be treated similarly in a further secondary preparation cell 215b and a further flotation cell 210b. The combined primary overflows 51b, 51c from rougher primary flotation cells 111b, 111c, both of which are also preceded by a preparatory flotation cell 115b, 115c, are directed into the preparation cell 215b of the further secondary flotation cell 210b via a collecting conduit 510. Underflow 42b from the further secondary flotation cell 210b is directed downstream to a preparation cell 315 of an additional secondary flotation cell 300.

Secondary overflow 50a from the first secondary flotation cell 210a, and secondary overflow 50b from the further secondary flotation cell 210b are directed out of the secondary flotation line 20 as a first concentrate 81.

The combined overflows 51d, 51e, 51f from further rougher primary flotation cells 111d, 111e, 111f are directed into the preparation flotation cell 305 of the additional secondary flotation cell 300 via a collecting conduit 510. The overflow 50 from the additional secondary flotation cell 300 comprises the recovered first concentration 81. Underflow 42' from the additional secondary flotation line 23 may be directed out of the flotation arrangement 1 as tailings flow 83.

Example 11

In FIG. 15, an embodiment of a flotation plant 9 according to the invention is presented.

The flotation plant 9 comprises two flotation arrangements 1a, 1b, which resemble the type described in Example 4, but may as well be of any of the types presented in the above examples. A first flotation arrangement 1a is intended for the recovery of a first concentrate 81, and a second flotation arrangement 1b is intended for the recovery of a second concentrate 82.

The rougher primary flotation cells 111a-e of a rougher part 11a of the first flotation arrangement 1a and the rougher primary flotation cells 121a-e of a rougher part 11a of the second flotation arrangement 1b are arranged in series.

As the functions and arrangement of flows of the flotation arrangements 1a, 1b have already been discussed in detail in connection with the above examples, the details of the flotation arrangements 1a, 1b are not discussed herein again.

The underflow 40' of the last scavenger primary flotation cell 112b of a scavenger part 12a of the primary line 10a of the first flotation arrangement 1a is directed into an arrangement suitable for further treating the mineral ore particles suspended in the slurry. In an embodiment, the arrangement may be a grinding step 62 or, in another embodiment, an arrangement 65 for the addition of flotation chemicals. (In FIG. 15, this arrangement is only shown in an exemplary manner, and it is to be understood that the box may represent either a grinding step 62 or an arrangement 65 for the addition of flotation chemicals, depending on the embodiment.)

In an embodiment where the arrangement comprises a grinding step 62, the second concentrate 82 recovered in the second flotation arrangement 1b contains ore particles comprising the same valuable mineral as the first concentrate 81 recovered in the first flotation arrangement 1a (i.e. the two concentrates have a same or similar mineralogy), but the particle size distribution of the second concentrate 82 is different due to the grinding step 62.

Alternatively, the further processing step may comprise reconditioning the slurry flow collected as underflow 40' of the first flotation arrangement 1a, i.e. treating the slurry with further flotation chemicals in order to prepare the slurry inflow 100b for the recovery of a second concentration 82. In that case, the second concentrate 82 recovered in the second flotation arrangement 1b contains ore particles comprising to different valuable mineral as the first concentrate 81 recovered in the first flotation arrangement 1a. The two concentrates have thus different mineralogy.

In an embodiment, the second concentrate 82 collected as primary overflows 51c-e from the last two rougher primary flotation cells 111c-d of the rougher part 11b second primary flotation line 10b may be combined and led directly into further processing, which may be, instead of an additional secondary flotation cell 300 as in the first flotation line 10a, any suitable further processing process or operation known in the art, for example a further cleaner flotation operation in a rougher cleaner flotation line. Overflow 52a, 52b of the scavenger primary flotation cells 112a, 112b of both flotation arrangements 1a, 1b may be treated as described earlier in this specification, either by directing the overflows to a regrinding step 64 and the to a scavenger cleaner flotation line; or by directing the overflows back into the primary flotation line (see FIG. 3).

The embodiments described hereinbefore may be used in any combination with each other. Several of the embodiments may be combined together to form a further embodiment. An arrangement, a method, a plant or a use, to which the disclosure is related, may comprise at least one of the embodiments described hereinbefore. It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A flotation arrangement for treating mineral ore particles suspended in slurry, comprising flotation cells for the separation of slurry into underflow and overflow wherein the separation is performed with the help of flotation gas, and wherein the flotation arrangement comprises a primary flotation line and a secondary flotation line, underflow of each preceding flotation cell of the primary flotation line being directed to a subsequent flotation cell of the primary flotation line as infeed until a last flotation cell of the primary flotation line, the primary flotation line comprising:
   a rougher part with at least two rougher primary flotation cells connected in series and arranged in fluid communication, the at least two rougher primary flotation cells comprising a first rougher primary flotation cell and a further rougher primary flotation cell, overflow from the first rougher primary flotation cell arranged to flow directly into the secondary flotation line, and
   a scavenger part with at least two scavenger primary flotation cells connected in series and arranged in fluid communication, overflow from the scavenger primary flotation cells arranged to flow back into the rougher part of the primary flotation line, or into a regrinding step and then into a scavenger cleaner flotation line,
   wherein the secondary flotation line comprises at least two secondary flotation cells, the at least two secondary flotation cells comprising a first secondary flotation cell and a further secondary flotation cell, wherein the first secondary flotation cell is arranged in direct fluid communication with the first rougher primary flotation cell, and primary overflow from the first rougher primary flotation cell is directed to the first secondary flotation cell via a first conduit for the recovery of a first concentrate, and
   the further secondary flotation cell is arranged in direct fluid communication with the further rougher primary flotation cell, and primary overflow from the further rougher primary flotation cell is directed to the further secondary flotation cell via a further conduit for the recovery of the first concentrate, and
   wherein the further secondary flotation cell is arranged in fluid communication with the first secondary flotation cell, and underflow from the first secondary flotation cell is arranged to flow into the further secondary flotation cell or to be combined with secondary underflow of the further secondary flotation cell.

2. The flotation arrangement according to claim 1, wherein the number of secondary flotation cells in series in the secondary flotation line is the same or lower than the number of primary flotation cells in series in the primary flotation line.

3. The flotation arrangement according to claim 1, wherein the first secondary flotation cell is arranged to receive primary overflow from one or two rougher primary flotation cells other than the first rougher primary flotation cell.

4. The flotation arrangement according to claim 1, wherein the first secondary flotation cell is arranged to receive primary overflow from at most one rougher primary flotation cell other than the first rougher primary flotation cell.

5. The flotation arrangement according to claim 4, wherein the first secondary flotation cell is arranged to receive primary overflow from no rougher primary flotation cell other than the first rougher primary flotation cell.

6. The flotation arrangement according to claim 1, wherein the further secondary flotation cell is arranged to receive primary overflow from at least one rougher primary flotation cell other than the further rougher primary flotation cell.

7. The flotation arrangement according to claim 1, wherein underflow from the further secondary flotation cell is arranged to flow back into the rougher part of the primary flotation line at a point downstream from the further rougher primary flotation cell.

8. The flotation arrangement according to claim 7, wherein underflow from the further secondary flotation cell is arranged to flow back into any rougher primary flotation cell downstream from the further rougher primary flotation cell.

9. The flotation arrangement according to claim 7, wherein underflow from the further secondary flotation cell is arranged to be combined into overflow from any at least one rougher primary flotation cell downstream from the further rougher primary flotation cell.

10. The flotation arrangement according to claim 1, wherein the secondary flotation line further comprises an additional secondary flotation line comprising at least one additional secondary flotation cell arranged to receive primary overflow from a yet further rougher primary flotation cell.

11. The flotation arrangement according to claim 10, wherein underflow from the further secondary flotation cell is arranged to flow into the additional secondary flotation cell.

12. The flotation arrangement according to claim 10, wherein the first secondary flotation cell is arranged to receive primary overflow from the first rougher primary flotation cell, and the additional secondary flotation cell is arranged to receive primary overflow from at least one rougher primary flotation cell other than the yet further rougher primary flotation cell.

13. The flotation arrangement according to claim 1, wherein underflow from the further secondary flotation cell is arranged to flow to a last of any rougher primary flotation cells from which primary overflow is arranged to flow to the further secondary flotation cell or to any rougher primary flotation cell downstream of the last of the any rougher primary flotation cells from which primary overflow is arranged to flow to the further secondary flotation cell.

14. The flotation arrangement according to claim 1, wherein the first secondary flotation cell of the secondary flotation line has a volume larger than the volume of the further secondary flotation cell of the secondary flotation line.

15. The flotation arrangement according to claim 1, wherein the further secondary flotation cell of the secondary flotation line has a volume larger than the volume of the first flotation cell of the secondary flotation line.

16. The flotation arrangement according to claim 1, wherein the first rougher primary flotation cell has a volume of at least 150 m3.

17. The flotation arrangement according to claim 1, wherein the further rougher primary flotation cell has a volume of at least 100 m3.

18. The flotation arrangement according to claim 1, wherein the further rougher primary flotation cell has a volume equal to the volume of the first rougher primary flotation cell or a volume smaller than the volume of the first rougher primary flotation cell.

19. The flotation arrangement according to claim 1, wherein the first secondary flotation cell has a volume in a range from 100 m3 to 2000 m3.

20. The flotation arrangement according to claim 1, wherein the further secondary flotation cell has a volume in a range from 100 m3 to 2000 m3.

21. The flotation arrangement according to claim 1, wherein the volume of the first secondary flotation cell is 2-50% of the aggregate volume of any at least one rougher primary flotation cell in fluid communication with the first secondary flotation cell.

22. The flotation arrangement according to claim 1, wherein the volume of the further secondary flotation cell is 2-50% of the aggregate volume of any one or more rougher primary flotation cells in fluid communication with the further secondary flotation cell.

23. The flotation arrangement according to claim 1, wherein flow of slurry between at least two flotation cells in fluid connection is driven by gravity.

24. The flotation arrangement according to claim 22, wherein flow of slurry between the first rougher primary flotation cell and the further rougher primary flotation cell is driven by gravity.

25. The flotation arrangement according to claim 22, wherein flow of slurry between the first secondary flotation cell and the further secondary flotation cell is driven by gravity.

26. The flotation arrangement according to claim 23, wherein flow of slurry between any rougher primary flotation cell and the first secondary flotation cell in fluid connection with the rougher primary flotation cell is driven by gravity.

27. The flotation arrangement according to claim 26, wherein flow of slurry between the first rougher primary flotation cell and the first secondary flotation cell is driven by gravity.

28. The flotation arrangement according to claim 24, wherein flow of slurry between the further rougher primary flotation cell and the further secondary flotation cell is driven by gravity.

29. The flotation arrangement according to claim 1, wherein primary overflow from at least one of the at least two scavenger primary flotation cells is arranged to flow directly into a regrinding step.

30. The flotation arrangement according to claim 29, wherein combined primary overflows from the at least two scavenger primary flotation cells are arranged to flow directly into a regrinding step.

31. The flotation arrangement according to claim 1, wherein combined secondary overflows of the at least two secondary flotation cells are arranged to flow into a further processing step.

32. The flotation arrangement according to claim 1, wherein the at least two scavenger primary flotation cells comprises a last scavenger primary flotation cell, and underflow from the last scavenger primary flotation cell is arranged to flow into a further processing step, or to leave the flotation arrangement as tailings.

33. The flotation arrangement according to claim 1, wherein underflow from the further secondary flotation cell is arranged to flow into a further processing step or to leave the flotation arrangement as tailings, or the at least two secondary flotation cells comprises a last secondary flotation cell other than the first secondary flotation cell and the further secondary flotation cell, underflow from the last secondary flotation cell arranged to flow into a further processing step or to leave the flotation arrangement as tailings.

34. The flotation arrangement according to claim 31, wherein the further processing step comprises at least one step selected from: a grinding step, a conditioning step, and a flotation step.

35. The flotation arrangement according to claim 1, wherein the flotation arrangement comprises a second primary flotation line that comprises a first rougher primary flotation cell, and the first secondary flotation cell of the at least two secondary flotation cells of the secondary flotation line is arranged to receive overflow from the first rougher primary flotation cell of the second primary flotation line.

36. The flotation arrangement according to claim 1, wherein the flotation cells of the flotation arrangement comprise a froth flotation cell.

37. The flotation arrangement according to claim 36, wherein the at least two rougher primary flotation cells comprises a third rougher primary flotation cell downstream from the further rougher primary flotation cell, and the third rougher primary flotation cell, and any subsequent rougher primary flotation cell after the third rougher primary flotation cell, comprises a froth flotation cell, or the at least two rougher primary flotation cells comprises a second rougher primary flotation cell and a third rougher primary flotation cell, and the third rougher primary flotation cell, and any subsequent rougher primary flotation cell after the third rougher primary flotation cell, comprises a froth flotation cell.

38. The flotation arrangement according to claim 36, wherein the at least two rougher primary flotation cells comprises a second rougher primary flotation cell, and the first rougher primary flotation cell and the second rougher primary flotation cell are operated as overflow flotation cells.

39. The flotation arrangement according to claim 36, wherein flotation gas is fed into any flotation cell of the flotation cells of the flotation arrangement, slurry being separated into overflow and underflow in the any flotation cell.

40. The flotation arrangement according to claim 39, wherein the any flotation cell into which flotation gas is fed comprises a mixer.

41. The flotation arrangement according to claim 36, wherein flotation gas is fed into a preparation flotation cell into which a mixer is arranged.

42. The flotation arrangement according to claim 1, wherein the mineral ore particles comprise Cu, or Zn, or Fe, or pyrite, or metal sulfide.

43. A flotation plant comprising a first flotation arrangement according to claim 1.

44. The flotation plant according to claim 43, wherein the flotation plant comprises any at least one or any at least two flotation arrangements other than the first flotation arrangement.

45. The flotation plant according to claim 43, wherein the flotation plant comprises the first flotation arrangement for the recovery of a first concentrate, and a second flotation arrangement according to claim 1 for the recovery of a second concentrate.

46. The flotation plant according to claim 45, wherein the primary flotation cells of the first flotation arrangement and the primary flotation cells of the second flotation arrangement are arranged in series.

47. The flotation plant according to claim 45, wherein the flotation plant comprises a treatment arrangement for further treating mineral ore particles suspended in slurry so that the second concentrate is different from the first concentrate.

48. The flotation plant according to claim 47, wherein the treatment arrangement for further treating mineral ore particles suspended in slurry comprises a grinding step, disposed between the first flotation arrangement and the second flotation arrangement.

49. The flotation plant according to claim 47, wherein the treatment arrangement for further treating mineral ore particles suspended in slurry comprises an addition arrangement for the addition of flotation chemicals, disposed between the first flotation arrangement and the second flotation arrangement.

50. The flotation plant according to claim 43, wherein the first flotation arrangement is arranged to recover mineral ore particles comprising Cu, and/or Zn, and/or pyrite, and/or a metal from a sulfide.

51. The flotation plant according to claim 43, wherein the first flotation arrangement is arranged to recover mineral ore particles comprising Cu from low grade ore.

52. The flotation plant according to claim 43, wherein the first flotation arrangement is arranged to recover Fe by reverse flotation.

53. The flotation arrangement according to claim 1, wherein the further secondary flotation cell is arranged to receive primary overflow from 1 or 2 rougher primary flotation cells other than the further rougher primary flotation cell.

54. The flotation arrangement according to claim 1, wherein the further secondary flotation cell is arranged to receive primary overflow from at most one rougher primary flotation cell other than the further rougher primary flotation cell.

55. The flotation arrangement according to claim 54, wherein the further secondary flotation cell is arranged to receive primary overflow from no rougher primary flotation cell other than the further rougher primary flotation cell.

56. The flotation arrangement according to claim 1, wherein the mineral ore particles comprise gold sulfide.

* * * * *